US012724634B2

(12) United States Patent
Uehara

(10) Patent No.: US 12,724,634 B2
(45) Date of Patent: Sep. 1, 2026

(54) MEDICAL INFORMATION PROCESSING SYSTEM AND MEDICAL INFORMATION PROCESSING METHOD, MEDICAL INFORMATION PROCESSING SERVICE PROVIDING METHOD, AND PROGRAM

(71) Applicant: FUJIFILM Corporation, Tokyo (JP)

(72) Inventor: Daiki Uehara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 464 days.

(21) Appl. No.: 18/460,581

(22) Filed: Sep. 3, 2023

(65) Prior Publication Data

US 2023/0409390 A1 Dec. 21, 2023

Related U.S. Application Data

(63) Continuation of application No. PCT/JP2022/004575, filed on Feb. 7, 2022.

(30) Foreign Application Priority Data

Mar. 24, 2021 (JP) ................................ 2021-050337

(51) Int. Cl.

| | |
|---|---|
| ***G06F 9/48*** | (2006.01) |
| ***G06F 9/455*** | (2018.01) |
| ***G06F 9/50*** | (2006.01) |

(52) U.S. Cl.

CPC ........ *G06F 9/4881* (2013.01); *G06F 9/45558* (2013.01); *G06F 9/48* (2013.01);

(Continued)

(58) Field of Classification Search

CPC ...... G06F 9/45558; G06F 9/48; G06F 9/4881; G06F 9/50; G06F 9/5005; G06F 9/5038;

(Continued)

(56) References Cited

U.S. PATENT DOCUMENTS 7,559,061 B1 * 7/2009 Gustafson ............... G06F 9/485 712/229
9,367,354 B1 * 6/2016 Ramsden-Pogue ....... G06F 9/50

(Continued)

FOREIGN PATENT DOCUMENTS

JP 2006285596 10/2006
JP 2015060279 3/2015

(Continued)

OTHER PUBLICATIONS

"Written Opinion of the International Searching Authority (Form PCT/ISA/237) of PCT/JP2022/004575," mailed on Apr. 19, 2022, with English translation thereof, pp. 1-6.

(Continued)

*Primary Examiner* — Charles M Swift
(74) *Attorney, Agent, or Firm* — JCIPRNET

(57) ABSTRACT

The medical information processing system, which includes a server cluster configured using a plurality of virtual machines, includes a first controller that distributes a processing request to a non-emergency system processing request queue or an emergency system processing request queue depending on a type of the received processing request, a non-emergency system processing module that performs a process corresponding to a non-emergency system processing request stacked in the non-emergency system processing request queue, an emergency system processing module that performs a process corresponding to an emergency system processing request stacked in the emergency system processing request queue, and a second controller that controls the number of the processing modules, in which control by the second controller includes temporarily stopping a part of a plurality of non-emergency system processing modules in operation and newly activating the emergency system processing module.

14 Claims, 10 Drawing Sheets

(52) U.S. Cl.
CPC .............. *G06F 9/50* (2013.01); *G06F 9/5005* (2013.01); *G06F 9/5038* (2013.01); *G06F 9/5083* (2013.01); *G06F 2009/45562* (2013.01); *G06F 2009/45575* (2013.01)

(58) Field of Classification Search
CPC ......... G06F 9/5083; G06F 2009/45562; G06F 2009/45575; G06F 2009/4557
See application file for complete search history.

(56) References Cited

U.S. PATENT DOCUMENTS 9,971,621 B1* 5/2018 Berg .................... G06F 9/5077
10,545,799 B2 1/2020 Tsuchimoto
11,175,859 B1* 11/2021 La Fratta ............. G06F 3/0659
2003/0163350 A1* 8/2003 Rudowski ............. G16H 40/67 705/2
2014/0101663 A1* 4/2014 Dickson ................ G06F 9/4881 718/103
2017/0041184 A1* 2/2017 Broz ................... H04L 43/0817
2017/0083368 A1* 3/2017 Bishop .................. G06F 3/0631
2020/0042349 A1* 2/2020 Jain .......................... G06F 9/546
2020/0312005 A1* 10/2020 Desai .................... G06F 9/5038
2021/0149726 A1 5/2021 Arai et al.

FOREIGN PATENT DOCUMENTS

JP 2018092311 6/2018
JP 2020024636 2/2020
JP 2020154530 9/2020

OTHER PUBLICATIONS

"International Search Report (Form PCT/ISA/210) of PCT/JP2022/004575," mailed on Apr. 19, 2022, with English translation thereof, pp. 1-5.

* cited by examiner

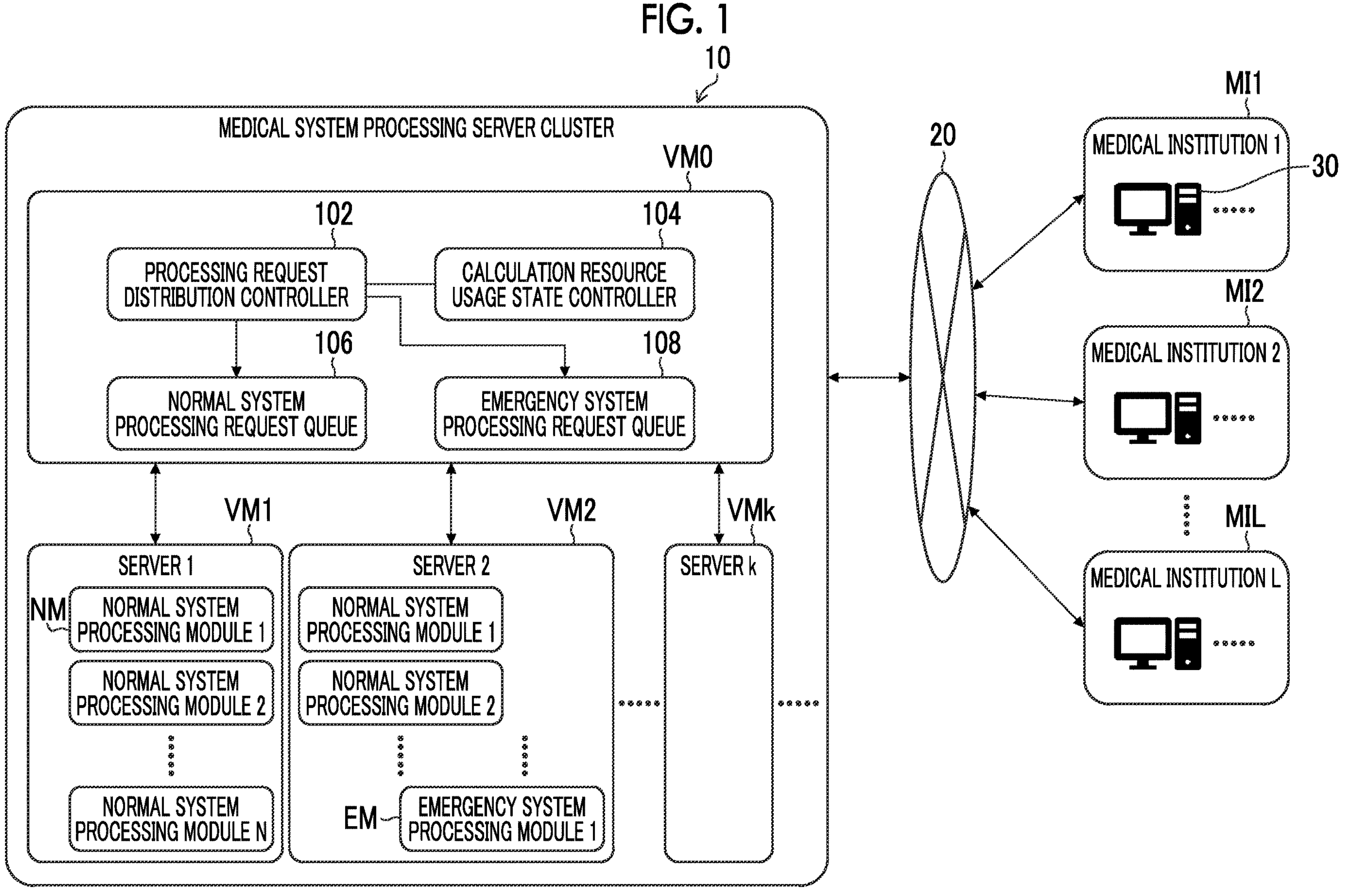
FIG. 1
10
MEDICAL SYSTEM PROCESSING SERVER CLUSTER
VM0
102
PROCESSING REQUEST DISTRIBUTION CONTROLLER
104
CALCULATION RESOURCE USAGE STATE CONTROLLER
106
NORMAL SYSTEM PROCESSING REQUEST QUEUE
108
EMERGENCY SYSTEM PROCESSING REQUEST QUEUE
VM1
SERVER 1
NM
NORMAL SYSTEM PROCESSING MODULE 1
NORMAL SYSTEM PROCESSING MODULE 2
NORMAL SYSTEM PROCESSING MODULE N
VM2
SERVER 2
NORMAL SYSTEM PROCESSING MODULE 1
NORMAL SYSTEM PROCESSING MODULE 2
EM
EMERGENCY SYSTEM PROCESSING MODULE 1
VMk
SERVER k
20
MI1
MEDICAL INSTITUTION 1
30
MI2
MEDICAL INSTITUTION 2
MIL
MEDICAL INSTITUTION L

FIG. 2

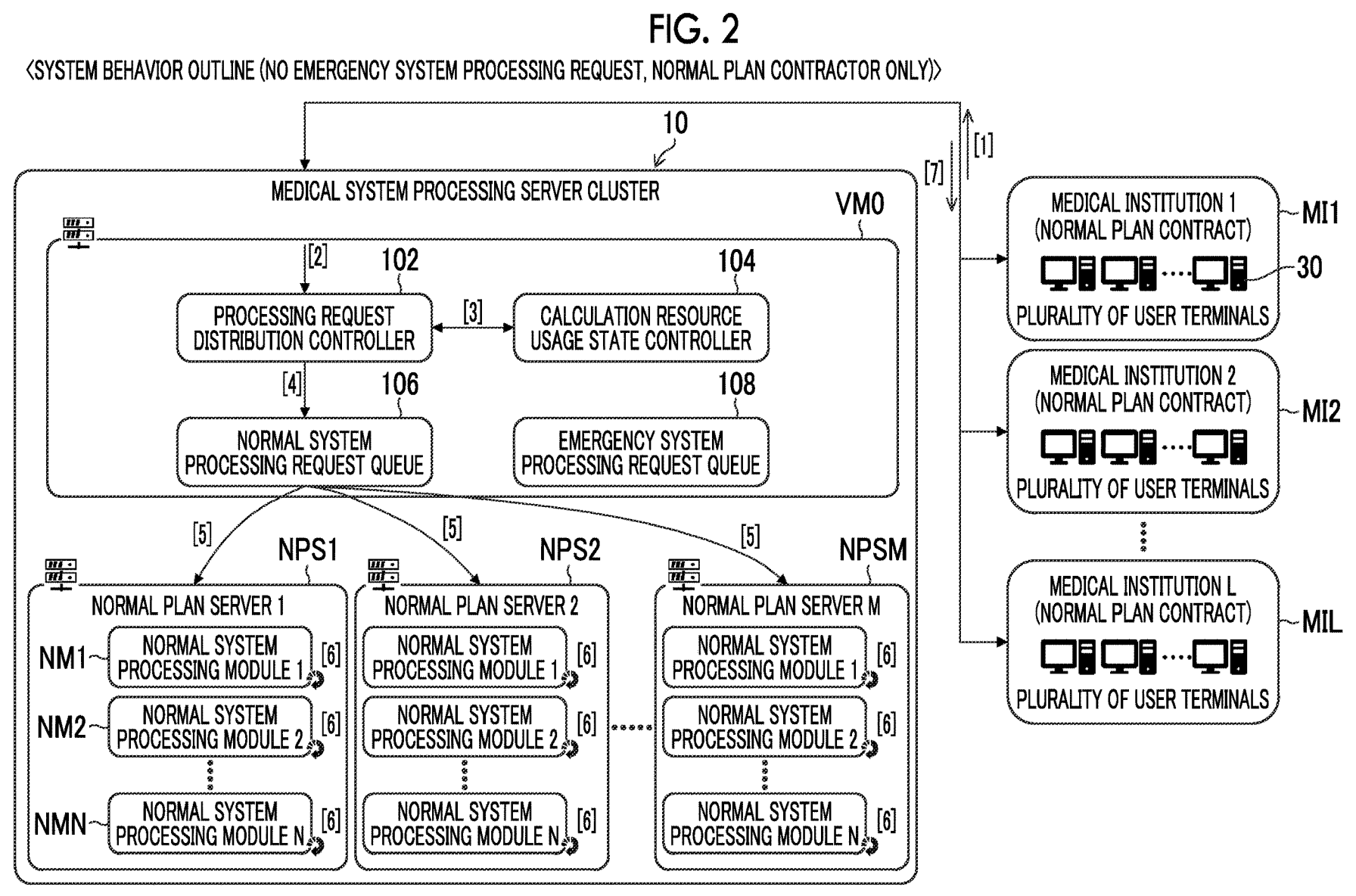

⟨SYSTEM BEHAVIOR OUTLINE (NO EMERGENCY SYSTEM PROCESSING REQUEST, NORMAL PLAN CONTRACTOR ONLY)⟩

10

MEDICAL SYSTEM PROCESSING SERVER CLUSTER

VM0

102 PROCESSING REQUEST DISTRIBUTION CONTROLLER

104 CALCULATION RESOURCE USAGE STATE CONTROLLER

106 NORMAL SYSTEM PROCESSING REQUEST QUEUE

108 EMERGENCY SYSTEM PROCESSING REQUEST QUEUE

[1] [2] [3] [4] [5] [6] [7]

NPS1 NORMAL PLAN SERVER 1

NPS2 NORMAL PLAN SERVER 2

NPSM NORMAL PLAN SERVER M

NM1 NORMAL SYSTEM PROCESSING MODULE 1

NM2 NORMAL SYSTEM PROCESSING MODULE 2

NMN NORMAL SYSTEM PROCESSING MODULE N

MI1 MEDICAL INSTITUTION 1 (NORMAL PLAN CONTRACT) PLURALITY OF USER TERMINALS 30

MI2 MEDICAL INSTITUTION 2 (NORMAL PLAN CONTRACT) PLURALITY OF USER TERMINALS

MIL MEDICAL INSTITUTION L (NORMAL PLAN CONTRACT) PLURALITY OF USER TERMINALS

FIG. 3

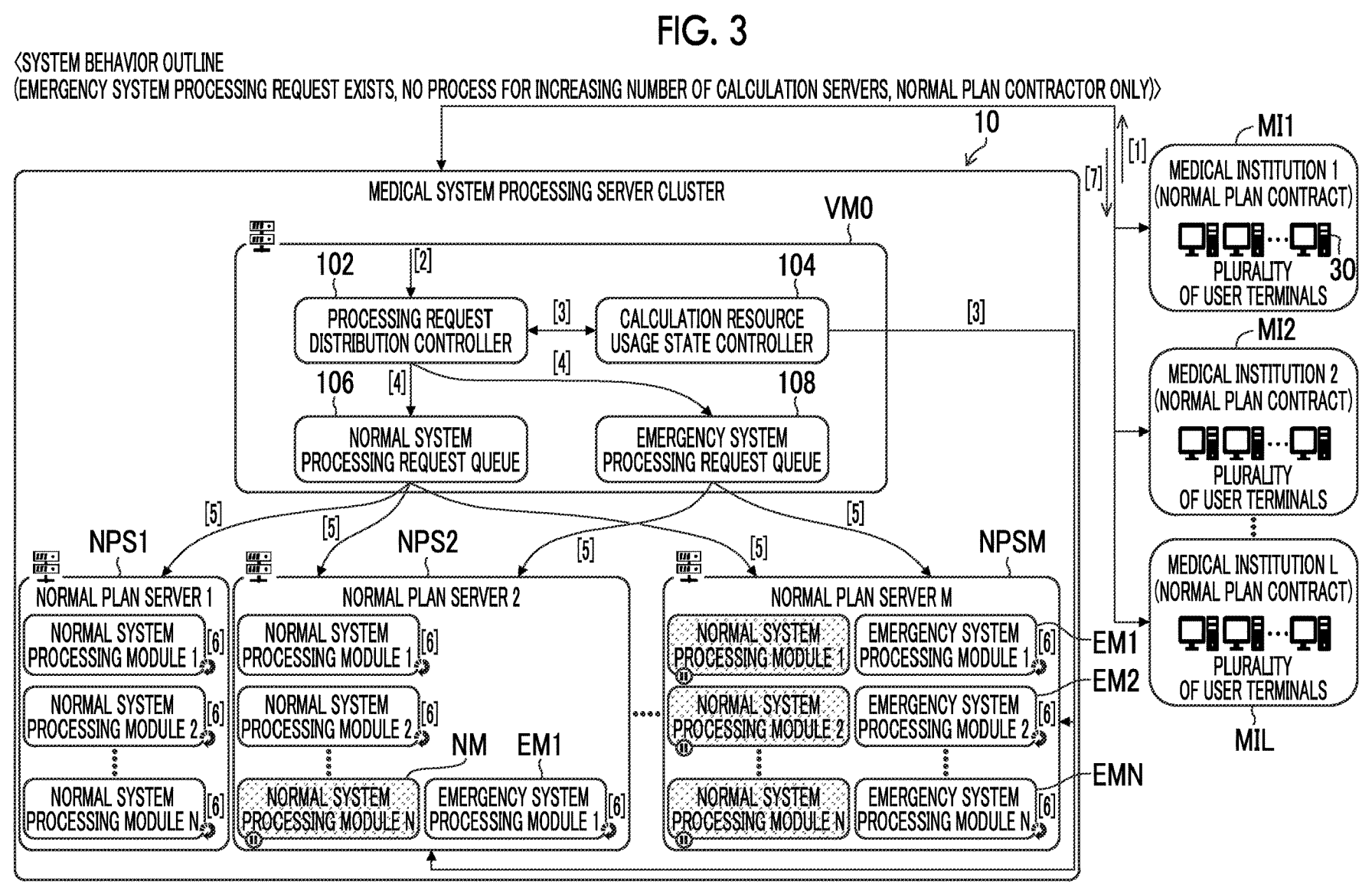

<SYSTEM BEHAVIOR OUTLINE
(EMERGENCY SYSTEM PROCESSING REQUEST EXISTS, NO PROCESS FOR INCREASING NUMBER OF CALCULATION SERVERS, NORMAL PLAN CONTRACTOR ONLY)>

FIG. 4

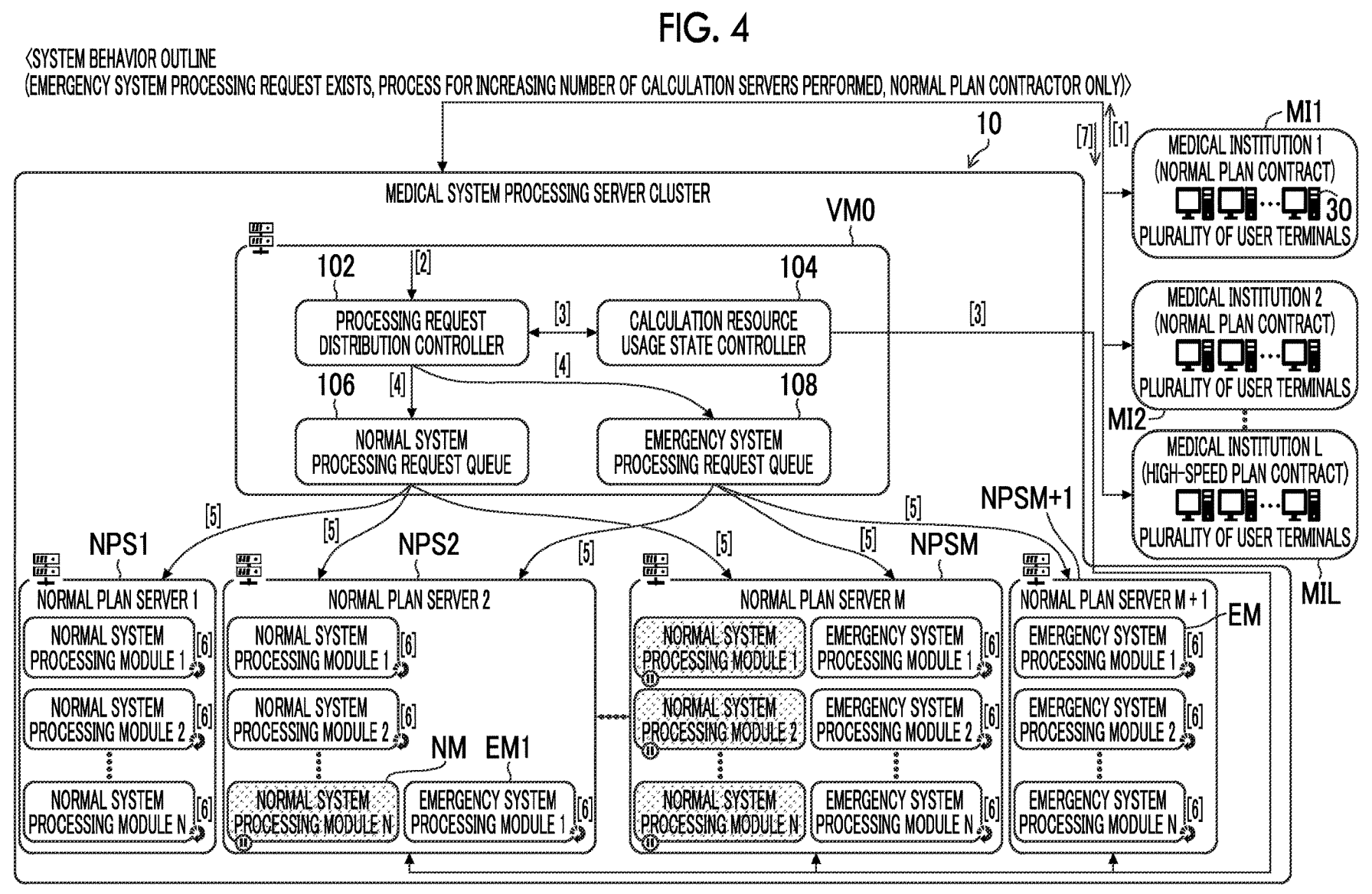

〈SYSTEM BEHAVIOR OUTLINE
(EMERGENCY SYSTEM PROCESSING REQUEST EXISTS, PROCESS FOR INCREASING NUMBER OF CALCULATION SERVERS PERFORMED, NORMAL PLAN CONTRACTOR ONLY)〉

10
MEDICAL SYSTEM PROCESSING SERVER CLUSTER
VM0
[2]
102
PROCESSING REQUEST DISTRIBUTION CONTROLLER
[3]
104
CALCULATION RESOURCE USAGE STATE CONTROLLER
[3]
[4]
[4]
106
NORMAL SYSTEM PROCESSING REQUEST QUEUE
108
EMERGENCY SYSTEM PROCESSING REQUEST QUEUE
[5]
[5]
[5]
[5]
[5]
[5]
NPS1
NORMAL PLAN SERVER 1
NORMAL SYSTEM PROCESSING MODULE 1 [6]
NORMAL SYSTEM PROCESSING MODULE 2 [6]
NORMAL SYSTEM PROCESSING MODULE N [6]
NPS2
NORMAL PLAN SERVER 2
NORMAL SYSTEM PROCESSING MODULE 1 [6]
NORMAL SYSTEM PROCESSING MODULE 2 [6]
NM
EM1
NORMAL SYSTEM PROCESSING MODULE N
EMERGENCY SYSTEM PROCESSING MODULE 1 [6]
NPSM
NORMAL PLAN SERVER M
NORMAL SYSTEM PROCESSING MODULE 1
EMERGENCY SYSTEM PROCESSING MODULE 1 [6]
NORMAL SYSTEM PROCESSING MODULE 2
EMERGENCY SYSTEM PROCESSING MODULE 2 [6]
NORMAL SYSTEM PROCESSING MODULE N
EMERGENCY SYSTEM PROCESSING MODULE N [6]
NPSM+1
NORMAL PLAN SERVER M + 1
EM
EMERGENCY SYSTEM PROCESSING MODULE 1 [6]
EMERGENCY SYSTEM PROCESSING MODULE 2 [6]
EMERGENCY SYSTEM PROCESSING MODULE N [6]
[7]
[1]
MI1
MEDICAL INSTITUTION 1 (NORMAL PLAN CONTRACT)
30
PLURALITY OF USER TERMINALS
MEDICAL INSTITUTION 2 (NORMAL PLAN CONTRACT)
PLURALITY OF USER TERMINALS
MI2
MEDICAL INSTITUTION L (HIGH-SPEED PLAN CONTRACT)
PLURALITY OF USER TERMINALS
MIL

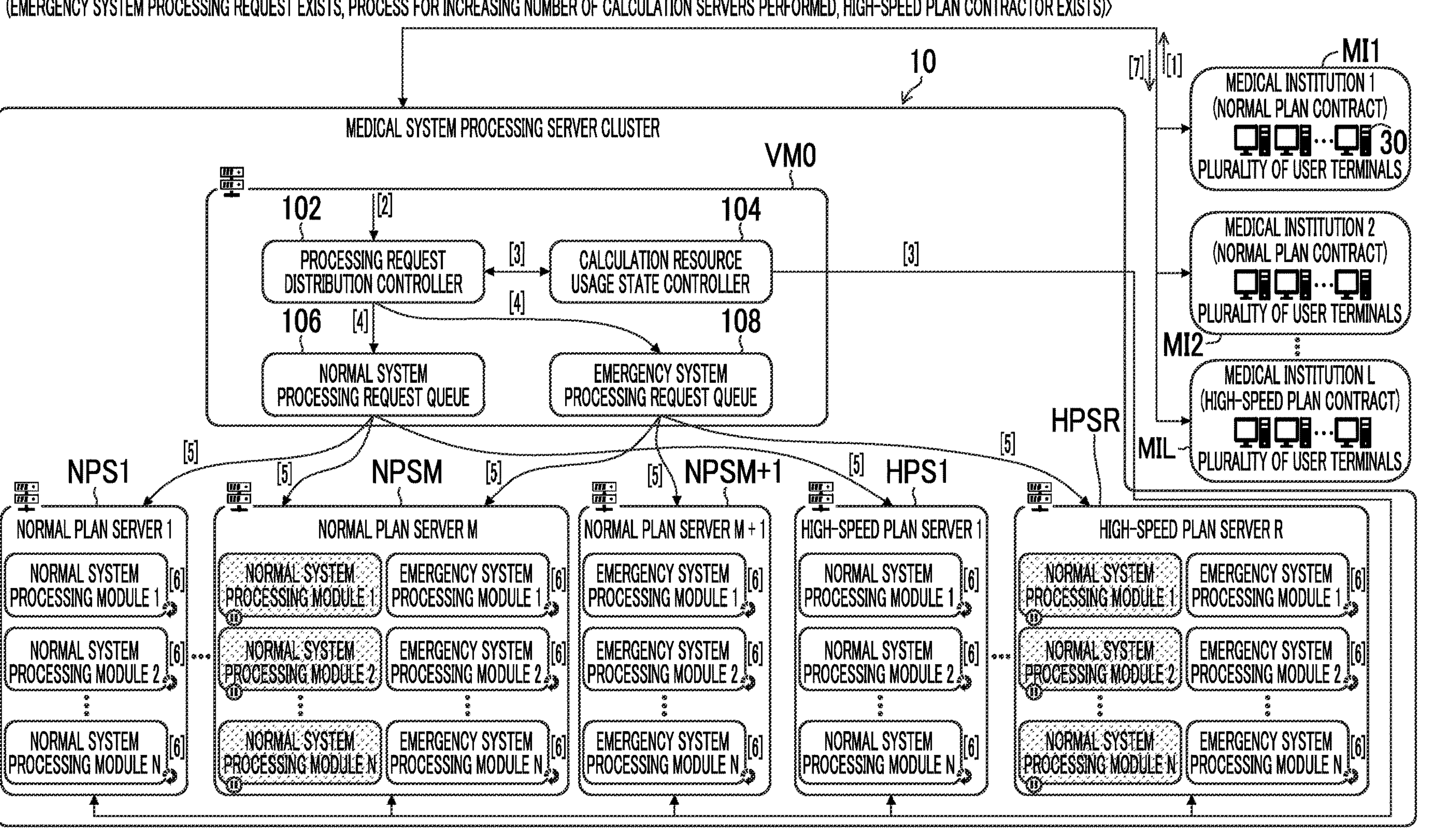
FIG. 5
<SYSTEM BEHAVIOR OUTLINE
(EMERGENCY SYSTEM PROCESSING REQUEST EXISTS, PROCESS FOR INCREASING NUMBER OF CALCULATION SERVERS PERFORMED, HIGH-SPEED PLAN CONTRACTOR EXISTS)>
10
[7]
[1]
MI1
MEDICAL INSTITUTION 1 (NORMAL PLAN CONTRACT)
30
PLURALITY OF USER TERMINALS
MEDICAL INSTITUTION 2 (NORMAL PLAN CONTRACT)
PLURALITY OF USER TERMINALS
MI2
MEDICAL INSTITUTION L (HIGH-SPEED PLAN CONTRACT)
PLURALITY OF USER TERMINALS
MIL
MEDICAL SYSTEM PROCESSING SERVER CLUSTER
VM0
102
[2]
104
PROCESSING REQUEST DISTRIBUTION CONTROLLER
[3]
CALCULATION RESOURCE USAGE STATE CONTROLLER
[3]
[4]
106
[4]
108
NORMAL SYSTEM PROCESSING REQUEST QUEUE
EMERGENCY SYSTEM PROCESSING REQUEST QUEUE
[5]
NPS1
NPSM
NPSM+1
HPS1
HPSR
NORMAL PLAN SERVER 1
NORMAL SYSTEM PROCESSING MODULE 1
NORMAL SYSTEM PROCESSING MODULE 2
NORMAL SYSTEM PROCESSING MODULE N
NORMAL PLAN SERVER M
NORMAL SYSTEM PROCESSING MODULE 1
EMERGENCY SYSTEM PROCESSING MODULE 1
NORMAL SYSTEM PROCESSING MODULE 2
EMERGENCY SYSTEM PROCESSING MODULE 2
NORMAL SYSTEM PROCESSING MODULE N
EMERGENCY SYSTEM PROCESSING MODULE N
NORMAL PLAN SERVER M + 1
EMERGENCY SYSTEM PROCESSING MODULE 1
EMERGENCY SYSTEM PROCESSING MODULE 2
EMERGENCY SYSTEM PROCESSING MODULE N
HIGH-SPEED PLAN SERVER 1
NORMAL SYSTEM PROCESSING MODULE 1
NORMAL SYSTEM PROCESSING MODULE 2
NORMAL SYSTEM PROCESSING MODULE N
HIGH-SPEED PLAN SERVER R
NORMAL SYSTEM PROCESSING MODULE 1
EMERGENCY SYSTEM PROCESSING MODULE 1
NORMAL SYSTEM PROCESSING MODULE 2
EMERGENCY SYSTEM PROCESSING MODULE 2
NORMAL SYSTEM PROCESSING MODULE N
EMERGENCY SYSTEM PROCESSING MODULE N
[6]

MEDICAL INFORMATION PROCESSING SYSTEM
10
20
Internet
300
350
DICOM SERVER
320A
IMAGE PROCESSING MANAGEMENT TERMINAL
324
ELECTRONIC MEDICAL RECORD SYSTEM
326
VIEWER TERMINAL
322
VIEWER TERMINAL
VIEWER TERMINAL
340
MEDICAL INSTITUTION 1 INTRA-MEDICAL-INSTITUTION NETWORK
MEDICAL INSTITUTION L INTRA-MEDICAL-INSTITUTION NETWORK

MEDICAL INFORMATION PROCESSING SYSTEM AND MEDICAL INFORMATION PROCESSING METHOD, MEDICAL INFORMATION PROCESSING SERVICE PROVIDING METHOD, AND PROGRAM

CROSS-REFERENCE TO RELATED APPLICATIONS

The present application is a Continuation of PCT International Application No. PCT/JP2022/004575 filed on Feb. 7, 2022 claiming priority under 35 U.S.C § 119(a) to Japanese Patent Application No. 2021-050337 filed on Mar. 24, 2021. Each of the above applications is hereby expressly incorporated by reference, in its entirety, into the present application.

BACKGROUND OF THE INVENTION

1. Field of the Invention

The present disclosure relates to a medical information processing system and a medical information processing method, a medical information processing service providing method, and a program, and more particularly, to a computer system and an information processing technique suitable for a medical information process for receiving a processing request for medical information from a plurality of medical institutions, for executing a process according to the processing request, and for returning a processing result to a request source.

2. Description of the Related Art

In the medical field, advances in image diagnostic apparatuses such as a computed tomography (CT) apparatus and a magnetic resonance imaging (MRI) apparatus have enabled image diagnosis using high-quality medical images having a high resolution. Particularly, in recent years, use of artificial intelligence (AI) by using a neural network trained by deep learning has improved accuracy of an analysis process for recognizing a lesion region or the like from an image or specifying a classification such as a disease name.

The analysis process such as computer-aided diagnosis or computer-aided detection (CAD) is generally prepared for each part such as a lung, a heart, a liver, and a brain or further, for each detectable lesion in many cases, and a high-performance computer is required to execute the analysis process. JP2018-092311A proposes a mechanism for providing a medical image analysis processing service using a cloud system.

JP2020-024636A discloses a job scheduling method for a computer system that simultaneously executes a plurality of jobs, in which a job with low priority is stopped and resources that have been used by the job with low priority are allocated to a job with high priority to execute the job with high priority.

SUMMARY OF THE INVENTION

For example, in a case where an image processing server dedicated to each medical institution is secured in order to provide various medical image processing functions such as lung CAD as a web service, a server operation cost for each facility is high regardless of whether the server is a physical server or a virtual server. Therefore, it is necessary to provide a central processing server or the like for an image process to form a configuration in which a plurality of medical institutions share a processing resource (calculation resource) in order to reduce the operation cost and make it possible to provide services at a lower cost.

In a case of adopting a central processing server type configuration in which a plurality of medical institutions share a processing resource, a processing request is transmitted from the plurality of medical institutions to one system. One problem of such a configuration is that, for example, in a case where a resource of a central processing server is strained because of a process on an examination image with low urgency, an image processing request from an emergency scene with high urgency waits for start of a process, and a situation can occur where a process of an emergency system with high urgency cannot be easily executed because of a process of a normal system with low urgency.

To address such a problem, it is conceivable that a processing request of the emergency system with high urgency is executed with priority. However, it is easily expected that, in a case where a process is executed with priority only for a processing request with high urgency, a process with low urgency is not executed for a long period, and normal medical care is affected.

In the invention described in JP2020-024636A, a method is proposed for stopping a job with low priority and for allocating a calculation resource to a job with higher priority according to priority of a processing request group from a client. However, in JP2020-024636A, there is no mechanism for securing an allowable maximum waiting time for each job. For this reason, in a case where the technology described in JP2020-024636A is applied to a medical image analysis processing service, for example, in a case where a job with low priority is a processing request of a normal medical care system and a job with high priority is a processing request of the emergency system, and in a case where emergency system processing requests are continuously transmitted from a large number of clients, there is a possibility that a process of the normal medical care system is made to wait beyond the allowable maximum waiting time, which affects the work such as normal medical care. Therefore, the mechanism described in JP2020-024636A is not suitable for a medical system process.

As a solution to such a problem, for example, it is conceivable that a server dedicated to a process for emergency with high urgency is prepared, and a processing request of the emergency system is transmitted to the server dedicated to the process of the emergency system. However, the process of the emergency system is required sporadically in many cases, and in a case where a dedicated server for emergency is always maintained, a situation occurs where secured calculation resources are excessive, an operation cost is generated unnecessarily, and as a result, a service usage fee becomes high, which is not desirable.

In addition, as another solution, a process for starting up a virtual machine for a process with high urgency as soon as a processing request with high urgency is generated is conceivable. However, in general, it may take several minutes to start up a virtual machine, which is not desirable in an emergency medical scene or the like where every moment counts.

The present disclosure has been made in view of such circumstances, and an object of the present disclosure is to provide a medical information processing system and a medical information processing method, a medical information processing service providing method, and a program capable of providing a processing result within an allowable waiting time for each of an emergency system process with high urgency and a non-emergency system process with low urgency while reducing an operation cost of a server or the like as much as possible.

A medical information processing system according to an aspect of the present disclosure is a medical information processing system that receives medical information as a processing target and a processing request, executes a process corresponding to the processing request, and outputs a processing result, and comprises a server cluster configured using a plurality of virtual machines, and the server cluster includes a first controller that receives the processing request and distributes the processing request to a non-emergency system processing request queue or an emergency system processing request queue depending on whether the processing request is a non-emergency system processing request for requesting a process classified into non-emergency or an emergency system processing request for requesting a process classified into emergency, a non-emergency system processing module that monitors the non-emergency system processing request queue and performs a process of a non-emergency system corresponding to instruction content of the non-emergency system processing request stacked in the non-emergency system processing request queue, an emergency system processing module that monitors the emergency system processing request queue and performs a process of an emergency system corresponding to instruction content of the emergency system processing request stacked in the emergency system processing request queue, a second controller that controls the number of non-emergency system processing modules to be operated and the number of emergency system processing modules to be operated based on the number of the emergency system processing requests that have been received by the first controller and the number of emergency system processing modules in operation, and control by the second controller includes temporarily stopping a part of a plurality of the non-emergency system processing modules in operation and newly activating the emergency system processing module to increase the number of the emergency system processing modules.

According to the present aspect, it is possible to dynamically adjust the number of non-emergency system processing modules to be operated on the server cluster and the number of emergency system processing modules to be operated on the server cluster according to demand of the emergency system processing request. In a case where the emergency system processing request increases, a part of the plurality of the non-emergency system processing modules in operation is temporarily stopped, and the number of emergency system processing modules is increased by using resources to address the demand of the emergency system processing request. In addition, the non-emergency system processing module to be temporarily stopped is a part of the processing modules, and the other part of the non-emergency system processing modules is maintained in an operation state. Accordingly, it is possible to provide a processing result within an allowable waiting time for both the emergency system process and the non-emergency system process while suppressing calculation resources that are used.

In the medical information processing system according to another aspect of the present disclosure, the second controller may be configured to calculate a first processing waiting time until completion of a process for the emergency system processing request from the number of the emergency system processing requests that have been received by the first controller and the number of the emergency system processing modules in operation, and increase the number of the emergency system processing modules in a case where the first processing waiting time exceeds a first allowable waiting time to keep the first processing waiting time within the first allowable waiting time.

In the medical information processing system according to another aspect of the present disclosure, the second controller may be configured to dynamically calculate an upper limit of the number of the non-emergency system processing modules that may be temporarily stopped within a range in which a second waiting time until completion of a process for the non-emergency system processing request falls within a second allowable waiting time, temporarily stop the non-emergency system processing modules of which the number of does not exceed the upper limit, and newly activate the emergency system processing module instead.

In the medical information processing system according to another aspect of the present disclosure, the second controller may be configured to increase the number of the virtual machines and newly activate the plurality of emergency system processing modules on the virtual machine that has been added to increase the number of the emergency system processing modules.

In the medical information processing system according to another aspect of the present disclosure, the second controller may be configured to decrease the number of the emergency system processing modules in a case where a state in which the number of the emergency system processing modules waiting for a process is equal to or greater than a defined number is maintained for defined time or more.

In the medical information processing system according to another aspect of the present disclosure, the second controller may be configured to decrease the number of the emergency system processing modules added with temporary stop of the non-emergency system processing module and resume the non-emergency system processing module that has been temporarily stopped in a case where a state in which the number of the emergency system processing modules waiting for a process is equal to or greater than a first defined number is maintained for first defined time or more.

In the medical information processing system according to another aspect of the present disclosure, the second controller may be configured to decrease the number of the emergency system processing modules on the virtual machine that has been added and decrease the number of the virtual machine that has been added in a case where a state in which the number of the emergency system processing modules waiting for a process is equal to or greater than a second defined number is maintained for second defined time or more.

In the medical information processing system according to another aspect of the present disclosure, the second controller may be configured to decrease the number of the emergency system processing modules added with temporary stop of the non-emergency system processing module and resume the non-emergency system processing module that has been temporarily stopped in a case where a state in which the number of the emergency system processing modules waiting for a process is equal to or greater than a first defined number is maintained for first defined time or more, and after resuming all of the non-emergency system processing modules that have been temporarily stopped, decrease the number of the emergency system processing modules on the virtual machine that has been added and decrease the number of the virtual machine that has been added.

In the medical information processing system according to another aspect of the present disclosure, the server cluster may be configured to calculate a current processing waiting time of a case of receiving a processing request for each of the non-emergency system processing request and the emergency system processing request and provide a user terminal of a medical institution with information on the current processing waiting time.

In the medical information processing system according to another aspect of the present disclosure, a first plan promising that a maximum waiting time until completion of a process for the non-emergency system processing request is a third waiting time, and a maximum waiting time until completion of a process for the emergency system processing request is a fourth waiting time shorter than the third waiting time, and a second plan promising that at least one of the maximum waiting time until the completion of the process for the non-emergency system processing request or the maximum waiting time until the completion of the process for the emergency system processing request is a waiting time shorter than the maximum waiting time of the first plan may be prepared, and the server cluster may be configured to include the non-emergency system processing module, the emergency system processing module, and the virtual machine for the first plan that are allocated to a process of a processing request from a medical institution that has selected the first plan, and the non-emergency system processing module, the emergency system processing module, and the virtual machine for the second plan that are allocated to a process of a processing request from a medical institution that has selected the second plan.

In a case of this aspect, the non-emergency system processing module, the emergency system processing module, and the virtual machine for the first plan may also be used for a process for a processing request from the medical institution that has selected the second plan.

In the medical information processing system according to another aspect of the present disclosure, the server cluster may be configured to increase or decrease the number of the non-emergency system processing modules for the second plan, the number of the emergency system processing modules for the second plan, and the number of the virtual machines for the second plan according to an increase or decrease in the number of medical institutions selecting the second plan.

The medical information processing system according to another aspect of the present disclosure is a medical information processing system that receives medical information as a processing target and a processing request, executes a process according to the processing request, and outputs a processing result, and comprises one or more processors and one or more storage devices storing a program executed by the one or more processors, in which the one or more processors operate as a server cluster configured by using a plurality of virtual machines according to a command of the program, processes executed by the server cluster includes processing request distribution control for receiving the processing request and distributing the processing request to a non-emergency system processing request queue or an emergency system processing request queue depending on whether the processing request is a non-emergency system processing request for requesting a process classified into non-emergency or an emergency system processing request for requesting a process classified into emergency, a process as a non-emergency system processing module for monitoring the non-emergency system processing request queue and for performing a process of a non-emergency system corresponding to instruction content of the non-emergency system processing request stacked in the non-emergency system processing request queue, a process as an emergency system processing module for monitoring the emergency system processing request queue and for performing a process of an emergency system corresponding to instruction content of the emergency system processing request stacked in the emergency system processing request queue, and calculation resource usage state control for controlling the number of the non-emergency system processing modules to be operated and the number of the emergency system processing modules to be operated based on the number of the emergency system processing requests that have been received by the server cluster and the number of the emergency system processing modules in operation, and the calculation resource usage state control includes a process for temporarily stopping a part of a plurality of the non-emergency system processing modules in operation and newly activating the emergency system processing module to increase the number of the emergency system processing modules.

A medical information processing service providing method according to another aspect of the present disclosure is a medical information processing service providing method implemented by using the medical information processing system according to an aspect of the present disclosure, and comprises receiving the processing request from a plurality of medical institutions via a communication line by the server cluster, and executing a process corresponding to the processing request and returning a processing result to a medical institution that is a request source of the processing request by the server cluster.

A medical information processing method according to another aspect of the present disclosure is a medical information processing method that is executed by a computer so that the computer performs a process for receiving medical information as a processing target and a processing request, executing a process corresponding to the processing request, and outputting a processing result, and comprises configuring a server cluster by using a plurality of virtual machines constructed on the computer, performing first control for receiving the processing request and distributing the processing request to a non-emergency system processing request queue or an emergency system processing request queue depending on whether the processing request is a non-emergency system processing request for requesting a process classified into non-emergency or an emergency system processing request for requesting a process classified into emergency by the server cluster, performing a process as a non-emergency system processing module for monitoring the non-emergency system processing request queue and for performing a process of a non-emergency system corresponding to instruction content of the non-emergency system processing request stacked in the non-emergency system processing request queue, performing a process as an emergency system processing module for monitoring the emergency system processing request queue and for performing a process of an emergency system corresponding to instruction content of the emergency system processing request stacked in the emergency system processing request queue, and performing second control for controlling the number of the non-emergency system processing modules to be operated and the number of the emergency system processing modules to be operated based on the number of the emergency system processing requests that have been received by the server cluster and the number of the emergency system processing modules in operation, in which the second control includes temporarily stopping a part of a plurality of the non-emergency system processing modules in operation and newly activating the emergency system processing module to increase the number of the emergency system processing modules.

A program according to another aspect of the present disclosure is a program for causing a computer to implement a process for receiving medical information as a processing target and a processing request, executing a process corresponding to the processing request, and outputting a processing result, and comprises configuring a server cluster by using a plurality of virtual machines constructed on the computer, and implementing a first control function for receiving the processing request and distributing the processing request to a non-emergency system processing request queue or an emergency system processing request queue depending on whether the processing request is a non-emergency system processing request for requesting a process classified into non-emergency or an emergency system processing request for requesting a process classified into emergency on the server cluster, a function of a non-emergency system processing module for monitoring the non-emergency system processing request queue and for performing a process of a non-emergency system corresponding to instruction content of the non-emergency system processing request stacked in the non-emergency system processing request queue, a function of an emergency system processing module for monitoring the emergency system processing request queue and for performing a process of an emergency system corresponding to instruction content of the emergency system processing request stacked in the emergency system processing request queue, and a second control function for controlling the number of the non-emergency system processing modules to be operated and the number of the emergency system processing modules to be operated based on the number of the emergency system processing requests that have been received by the first control function and the number of the emergency system processing modules in operation, in which the second control function includes a function for temporarily stopping a part of a plurality of the non-emergency system processing modules in operation and newly activating the emergency system processing module to increase the number of the emergency system processing modules.

According to an aspect of the present disclosure, it is possible to adaptively control the number of the emergency system processing modules and the number of the non-emergency system processing modules operating on the server cluster according to a demand state of the emergency system processing request. Accordingly, it is possible to provide a processing result within the allowable waiting time for each of the emergency system process with high urgency and the non-emergency system process with low urgency while reducing the operation cost of the server or the like that constructs the system including the virtual machine.

BRIEF DESCRIPTION OF THE DRAWINGS

FIG. 1 is a block diagram showing a configuration of a medical information processing system according to an embodiment.

FIG. 2 is a block diagram showing an outline of operation of the medical information processing system according to the embodiment, and shows an example of a case where there is no emergency system processing request and there is only a normal plan contractor.

FIG. 3 is a block diagram showing an outline of operation of the medical information processing system according to the embodiment, and shows an example of a case where there is an emergency system processing request, there is no process for increasing the number of calculation servers, and there is only a normal plan contractor.

FIG. 4 is a block diagram showing an outline of operation of the medical information processing system according to the embodiment, and shows an example of a case where there is an emergency system processing request, there is a process for increasing the number of calculation servers, and there is only a normal plan contractor.

FIG. 5 is a block diagram showing an outline of operation of the medical information processing system according to the embodiment, and shows an example of a case where there is an emergency system processing request, there is the process for increasing the number of calculation servers, and there is a high-speed plan contractor.

DESCRIPTION OF THE PREFERRED EMBODIMENTS

Figure 6:
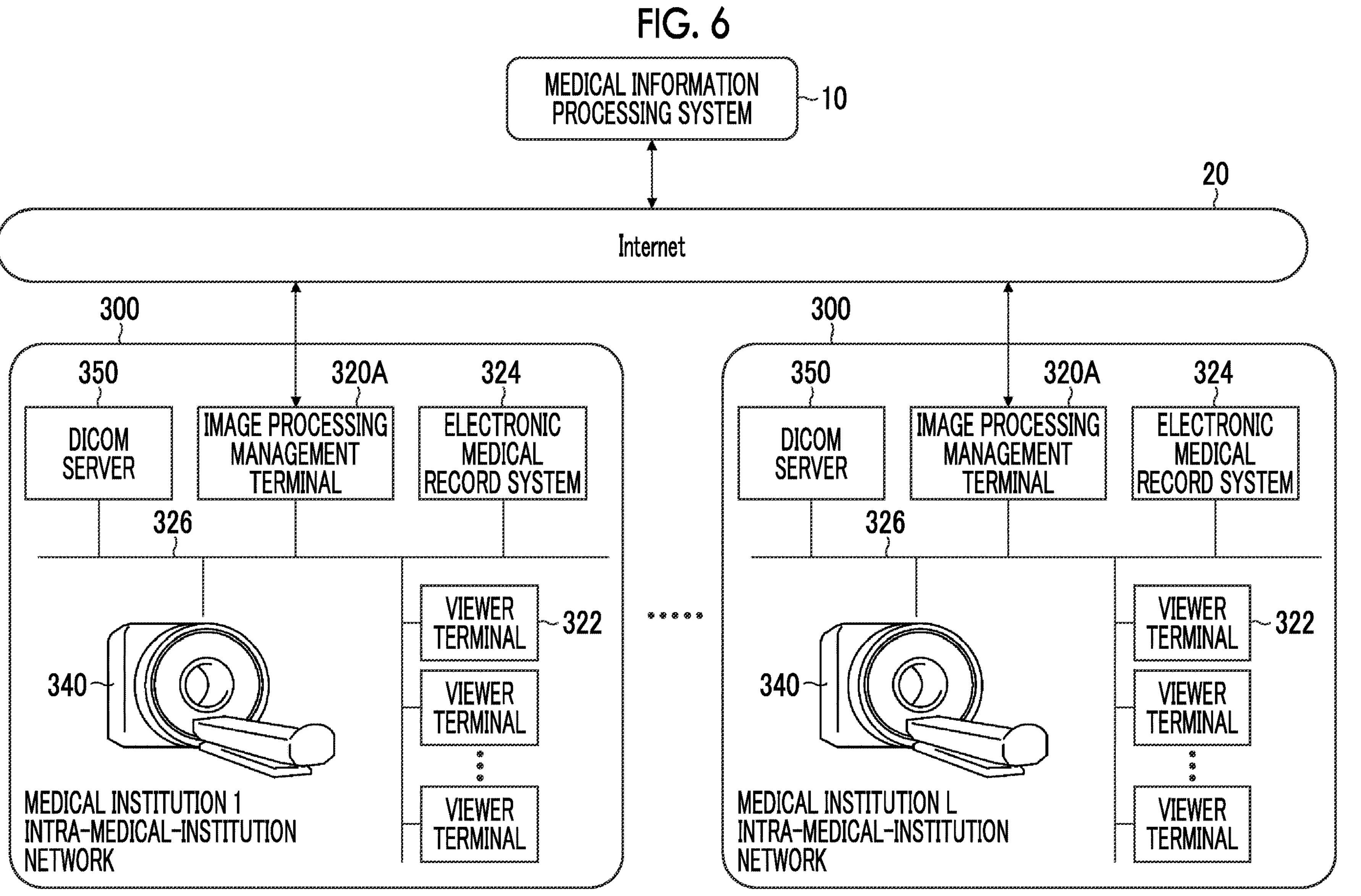
FIG. 6 is a block diagram showing an example of an intra-medical-institution information system of a plurality of medical institutions using the medical information processing system.

Hereinafter, a preferable embodiment of the present invention will be described with reference to the accompanying drawings.

<<Outline of Medical Information Processing System>>

FIG. 1 is a block diagram showing a configuration of a medical information processing system 10 according to the embodiment. The medical information processing system 10 is a computer system including a medical system processing server cluster that provides a web service that receives medical information as a processing target such as a medical image and a processing request for the medical information from a plurality of medical institutions via a communication line 20, executes a process according to the processing request, and returns a processing result to the medical institutions that are request sources.

In the present embodiment, a system that provides a medical image processing service is exemplified, but medical information as a processing target is not limited to a medical image, and may be medical data other than an image, such as genomic data, electrocardiographic waveform data, blood examination data, or audio data, or may be a combination of a plurality of types of data.

The medical system process refers to a process related to an application for medical equipment that can be classified into an emergency system or a normal system other than the emergency system. In the present specification, the term "normal" is synonymous with "non-emergency". The medical system process includes, for example, a medical image process for processing a medical image captured using medical equipment such as a CT apparatus or an MRI apparatus to perform detection, segmentation, labeling, or the like of a lesion. The medical system process is an example of a medical information process, and a medical image is an example of medical information.

The communication line 20 may be a wide area network including the Internet. Displays of "medical institution 1", "medical institution 2", . . . and "medical institution L" shown in FIG. 1 represent that L medical institutions exist. A medical institution is, for example, a hospital, a clinic, a medical research center, a medical examination center, or the like. Hereinafter, an index for identifying each medical institution is denoted by j, and is expressed as a medical institution MIj. j represents an integer from 1 to L (j=1, 2, . . . L).

Each medical institution MIj has an intra-medical-institution network, and one or more user terminals 30 are connected to each intra-medical-institution network for each medical institution MIj. The user terminal 30 is an information processing apparatus present in each intra-medical-institution network, and is a terminal for using a processing service provided by the medical system processing server cluster of the medical information processing system 10. Here, the user terminal 30 refers to a calculation resource existing in a network in which data in a medical institution can be safely accessed, and the user terminal 30 may not physically exist in the medical institution. The user terminal 30 may be a physical machine or a virtual machine, and a specific form is not limited. The user terminal 30 may be a workstation, a personal computer, a tablet terminal, or the like.

Client software for using a processing function of the medical information processing system 10 is constructed in the user terminal 30. Here, the client software may be in any form as long as an image processing service provided by the medical system processing server cluster of the medical information processing system 10 can be used in the client software. The client software may be a dedicated application, a general-purpose web browser, or the like.

The medical system processing server cluster functioning as the medical information processing system 10 is configured using a virtual machine. A deployment destination of the virtual machine needs only be an environment in which a virtual machine group can be hosted, and may be, for example, a cloud computing environment. FIG. 1 shows a virtual machine cluster including a plurality of virtual machines VM0, VM1, VM2, . . . and VMk . . . . Hereinafter, an index for identifying each virtual machine is denoted by k, and is expressed as a virtual machine VMk. k is an integer of 0 or more. The number of virtual machines can be increased or decreased as necessary. The virtual machine cluster may be constructed on one physical machine, or may be constructed on a plurality of physical machines.

After constructing the medical system processing server cluster by using a virtual machine VMk, a processing request distribution controller 102, a calculation resource usage state controller 104, a normal system processing request queue 106, an emergency system processing request queue 108, a normal system processing module NM, and an emergency system processing module EM, which are necessary for providing the web service of a medical image process, are deployed on the cluster. In a situation where the medical information processing system 10 has not received an emergency system processing request immediately after the deployment of these modules, only installation of configuration necessary for activation of the emergency system processing module EM has been performed, and the activation itself has not been performed.

The processing request distribution controller 102 receives a processing request from the user terminal 30 of each medical institution MIj, and distributes the processing request to the normal system processing request queue 106 or the emergency system processing request queue 108 depending on a type of the processing request. That is, the processing request distribution controller 102 determines whether the received processing request is a processing request for requesting a process of the normal system or a processing request for requesting a process of the emergency system, and transmits the processing request to the normal system processing request queue 106 or the emergency system processing request queue 108 depending on the determined type of the processing request.

The normal system processing request queue 106 is a queue that temporarily stores (stacks) a processing request other than an emergency system processing request. The emergency system processing request queue 108 is a queue that temporarily stores a processing request of the emergency system.

In the present specification, a processing request of an emergency system with high urgency from an emergency scene or the like is referred to as an "emergency system processing request", and a processing request of a normal system with low urgency such as an examination of normal medical care is referred to as a "normal system processing request". The urgency may be rephrased as "priority". The processing request issued from the user terminal 30 is classified into either a normal system processing request or an emergency system processing request. The process of the emergency system corresponding to an emergency system processing request is referred to as "emergency system processing", and the process of the normal system corresponding to a normal system processing request is referred to as "normal system processing". Processing content of the emergency system process may be different from processing content of the normal system process. For example, the normal system process includes a lung CAD process, and the emergency system process includes a pneumothorax region detection process, a cerebral infarction detection process, a cerebral bleeding detection process, or the like.

The calculation resource usage state controller 104 monitors the type of the processing request transmitted to the processing request distribution controller 102 and the number of processing requests retained in each processing request queue of the normal system processing request queue 106 and the emergency system processing request queue 108, and controls temporary stop of the normal system processing module NM in operation, additional activation of the emergency system processing module EM, and also, addition of a calculation node, and the like according to a request state and a processing state of an emergency system processing request. Here, the calculation node is a calculation server using a virtual machine.

FIG. 1 shows an example in which the processing request distribution controller 102, the calculation resource usage state controller 104, the normal system processing request queue 106, and the emergency system processing request queue 108 are deployed in the virtual machine VM0, and the normal system processing module NM and/or the emergency system processing module EM are deployed in the virtual machines VM1, VM2, . . . VMk, . . . and so on.

The normal system processing module NM is a processing module that performs a medical image process of the normal system. Displays of "normal system processing module 1", "normal system processing module 2", . . . and "normal system processing module N" shown in FIG. 1 indicate that N normal system processing modules are deployed in each calculation node.

The emergency system processing module EM is a processing module that performs a medical image process of the emergency system. In FIG. 1, only an "emergency system processing module 1" is shown, but a plurality of emergency system processing modules EM can be deployed in each calculation node depending on a request state and a processing state of an emergency system processing request.

Each of the normal system processing module NM and the emergency system processing module EM monitors the corresponding processing request queue, and performs a process according to an execution instruction as soon as the execution instruction arrives. The normal system processing module NM performs the process of the normal system corresponding to instruction content of a normal system processing request stacked in the normal system processing request queue 106. The emergency system processing module EM performs the process of the emergency system corresponding to instruction content of an emergency system processing request stacked in the emergency system processing request queue 108.

<<Types of Usage Contract for Present Service>>

In a medical image processing service provided using the medical information processing system 10, a normal plan and a high-speed plan are prepared. The normal plan is a type of plan for using a service using the medical information processing system 10, and is a plan having a specification in which a calculation resource is shared among a larger number of medical institutions than in a high-speed plan that will be described later, and thus, a usage fee is lower than that of the high-speed plan, but a maximum waiting time from issuance of a processing request to completion of a process (until reception of a processing result) is long.

The high-speed plan is a type of plan for using a service using the medical information processing system 10, and is a plan having a specification in which the usage fee is higher than that of the normal plan, but the maximum waiting time from issuance of a processing request to completion of a process is short. For a processing request from a high-speed plan contractor, the goal is to shorten the waiting time by allocating more calculation resources than for a normal plan contractor.

The maximum waiting time is determined according to contractual content, for example, in a case of the normal plan, the maximum waiting time for the normal system process is ten minutes and the maximum waiting time for the emergency system process is three minutes, and in a case of the high-speed plan, the maximum waiting time for the normal system process is three minutes and the maximum waiting time for the emergency system process is one minute.

Each of three minutes of the maximum waiting time for the emergency system process determined in the normal plan and one minute of the maximum waiting time for the emergency system process determined in the high-speed plan is an example of a "first allowable waiting time" in the present disclosure. Each of ten minutes of the maximum waiting time for the normal system process determined in the normal plan and three minutes of the maximum waiting time for the normal system process determined in the high-speed plan is an example of a "second allowable waiting time" in the present disclosure. The maximum waiting time of ten minutes for the normal system process and the maximum waiting time of three minutes for the emergency system process determined in the normal plan are examples of a "third waiting time" and a "fourth waiting time" in the present disclosure.

Although it is a preferable form that each of the maximum waiting time for the normal system process and the maximum waiting time for the emergency system process in the high-speed plan is shorter than the corresponding maximum waiting time in the normal plan, only the maximum waiting time for at least one of the normal system process or the emergency system process in the high-speed plan needs to be shorter than that of the normal plan.

Each medical institution MIj can use the medical image processing service by the medical information processing system 10 by selecting either the normal plan or the high-speed plan to make a usage contract with a provider of the present service. The normal plan is an example of a "first plan" in the present disclosure. The high-speed plan is an example of a "second plan" in the present disclosure.

<<Outline of System Behavior>>

First, a system behavior in a case where a user (medical institution) of the present service is only a normal plan contractor will be described with reference to FIGS. 2 to 4.

<Example 1> a Case where there is No Emergency System Processing Request and there is Only a Normal Plan Contractor FIG. 2 is a block diagram showing an outline of operation of the medical information processing system 10 according to the embodiment. FIG. 2 is an example of a case where an emergency system processing request is not transmitted from any medical institution MIj, and is a diagram representing a series of flows of a case where only the normal system processing module NM out of two types of processing modules of the normal system and the emergency system operates on M calculation servers, and only a normal system processing request is processed inside the medical system processing server cluster. In FIG. 2, it is assumed that each medical institution MIj have contracted for the normal plan.

Displays of "normal plan server 1", "normal plan server 2", . . . and "normal plan server M" shown in FIG. 2 are the calculation servers for processing module deployment, and represent servers shared among normal plan contractors. Each of the M calculation servers is expressed as a calculation server NPS1, NPS2, . . . or NPSM. N normal system processing modules NM operate in each calculation server NSPk. In a processing module group of the N normal system processing modules NM, processing modules that execute different types of processes may be mixed. In addition, combination of types of processing modules deployed on different calculation servers may be the same or different.

A specific example of how the user uses the present system will be described using a flow of procedures [1] to [7] in FIG. 2 as an example.

Procedure [1]: In procedure [1], the user performs a processing request for a medical image to the medical information processing system 10 by using client software for using the present system, which is installed on the user terminal 30. In this case, the determination as to whether the processing request transmitted from the user terminal 30 is a processing request related to a normal examination or the like (normal system processing request) or a processing request related to an examination at the emergency scene or the like (emergency system processing request) may be performed by the user designating the type of the processing request or may be performed in a programmed manner using a type of client software that is used or the like. In the example of FIG. 2, description will proceed on an assumption that only a normal system processing request is transmitted.

Procedure [2]: In procedure [2], the processing request transmitted from the user terminal 30 to the medical information processing system 10 is first received by the processing request distribution controller 102, and request content is interpreted.

Procedure [3]: Procedure [3] in FIG. 2 indicates that the calculation resource usage state controller 104 monitors the type of the processing request entering into the processing request distribution controller 102. Since the calculation resource usage state controller 104 realizes the function thereof in a case where an emergency system processing request shown in FIGS. 3 and 4 that will be described later is received, the calculation resource usage state controller 104 does not particularly operate in the example of FIG. 2.

Procedure [4]: In procedure [4], the processing request distribution controller 102 transmits the content of the processing request to a queue corresponding to the type of the received processing request (the normal system processing request queue 106 or the emergency system processing request queue 108). Here, the queue may be any form such as a message queue or a relational database as long as the queue can temporarily store a certain processing request until the processing request is processed by the processing module. The processing request distribution controller 102 stacks processing requests to the corresponding queue in response to the normal system processing request or the emergency system processing request.

Procedure [5]: In procedure [5], the normal system processing module NMn receives the normal system processing request from the normal system processing request queue 106. A receiving method thereof may be implemented in any manner as long as the method is in implementation in which the normal system processing module NMn can start the process in a case where there is a new arrival processing request in the normal system processing request queue 106. A suffix n in notation of the normal system processing module NMn is an index for identifying a normal system processing module activated on a calculation server. In the example of FIG. 2, n represents an integer from 1 to N.

Procedure [6]: The normal system processing module NMn that has received the normal system processing request from the normal system processing request queue 106 performs a necessary process corresponding to the processing request in procedure [6]. In the example in FIG. 2, the normal system processing module NM in charge of the normal system process acquires the processing request from the normal system processing request queue 106 and performs a process.

Here, the maximum number of processing modules activated on each calculation server is determined by the number of CPUs and an amount of memory that needs to be allocated to each processing module, and by an upper limit of the number of CPU cores and an amount of memory of each calculation server. This does not depend on the type of the processing module such as whether the processing module activated on the calculation server is the normal system processing module NM or the emergency system processing module EM. FIG. 2 shows an example of a case where the maximum number of processing modules activated on each calculation server is N. The maximum number of processing modules activated on a calculation server may be different for each server.

Procedure [7]: In procedure [7], the user terminal 30 that is a transmission source (request source) of the processing request acquires a processing result from the medical information processing system 10. Each user terminal 30 may periodically inquire with the medical system processing server cluster whether or not a processing result can be acquired, and may start acquisition of the result from the medical system processing server cluster in a case where the processing result can be acquired, or the medical system processing server cluster may notify the user terminal 30 that the result can be acquired, and the user terminal 30 may start the acquisition of the result in response to the notification. The user of the user terminal 30 can view the result as soon as the analysis result is acquired by the user terminal 30.

Since the normal system processing request is generated in normal medical care or the like, although the number of normal system processing requests is different for each medical institution, the number of normal system processing requests in each medical institution is not likely to greatly increase or decrease in one day, and in a case where the number of medical institutions that is used is fixed, the number of the normal system processing requests that is constantly transmitted is approximately fixed. Therefore, for a minimum value of the number of the calculation servers constantly operated by the medical information processing system 10 according to the present embodiment, the number of the medical institutions under the usage contract, the maximum number of normal system processing requests of each medical institution expected at peak time, and the maximum allowable waiting time until completion of a process for the normal system processing requests at the peak time are taken into consideration, and the necessary and sufficient number is obtained and adopted as the minimum value.

M of the number (M servers) of normal plan servers shown in FIG. 2 represents the minimum value obtained from such a viewpoint, and indicates that the M calculation servers are always operated in a situation where there is no emergency system processing request.

Regarding the maximum allowable waiting time until the completion of the process for the normal system processing request, an agreement with each medical institution is reached in advance. A medical institution that wishes to further shorten the maximum allowable waiting time can shorten the waiting time by contracting for a high-speed plan that will be described later.

The M calculation servers need to be operated during a normal outpatient medical care reception time (during a normal medical care service time) by a medical institution, for example, from 8:00 to 18:00 during the day, and the number of calculation servers that always operate may be smaller than M in other time slots.

<Example 2> a Case where there is an Emergency System Processing Request and there is Only a Normal Plan Contractor FIGS. 3 and 4 are block diagrams representing a series of flows of system operation in a state where an emergency system processing request is transmitted from a medical institution MI. Unlike FIG. 4 that will be described later, FIG. 3 represents a situation where it is not necessary to add an (M+1)th calculation server because the number of the emergency system processing requests is smaller than the number that can be processed by the M calculation servers of the medical system processing server cluster.

On the other hand, FIG. 4 represents a case where an emergency system processing request cannot be processed completely with the number of emergency system processing modules EM which can be activated by M calculation servers, and represents a series of flows of system operation of a case where processing capability for an emergency system processing request is enhanced by adding an (M+1) th calculation server.

In procedure [1] in FIG. 3, an emergency system processing request is transmitted together with a normal system processing request from the user terminal 30. The normal system processing request and the emergency system processing request transmitted from the user terminal 30 are received by the processing request distribution controller 102 (procedure [2]).

In procedure [3], the calculation resource usage state controller 104 monitors the processing request distribution controller 102. Simultaneously with the processing request distribution controller 102 receiving the emergency system processing request, the calculation resource usage state controller 104 performs the following operation.

In a case where the number of emergency system processing requests received by the processing request distribution controller 102 exceeds a threshold value for increasing the emergency system processing modules EM, the calculation resource usage state controller 104 temporarily stops a part of the normal system processing modules NM in operation, and activates the emergency system processing modules EM instead. In FIG. 3, the normal system processing modules NM painted with a dot pattern represent the temporarily stopped processing modules (the same applies to FIGS. 4 and 5).

In this case, in order to suppress time loss required for activation preparation as much as possible, the emergency system processing module EM may be made to always wait within a range in which an operation cost is not a burden. For example, as in an Mth normal plan server NPSM in FIG. 3, with the emergency system processing modules EM1 to N always occupying all of one calculation server, the server operation cost is more than necessary in a case where the number of emergency system processing requests is small; however, with the emergency system processing module EM sharing the same server as the normal system processing module NM as in a normal plan server NPS2, it may be allowable to always make a small number of emergency system processing modules EM wait from the viewpoint of operation cost.

Here, the threshold value for increasing the number of the emergency system processing modules EM is, for example, a case where a processing waiting time is dynamically obtained from the number of received processing requests and the number of emergency system processing modules EM currently in operation, and the maximum allowable waiting time of the emergency system processing module EM is exceeded.

The temporary stop of the normal system processing module NM in operation may be performed by using a mechanism for temporarily stopping a process provided by a Linux (registered trademark) or Windows (registered trademark) operating system (OS) or the like, or may take a form in which a state in the middle of a process is temporarily stored in a file or the like and is read and resumed in a case where the state is processed again.

The calculation resource usage state controller 104 sets an upper limit to the number of normal system processing modules NM that can be temporarily stopped. This is to prevent a process of a normal system processing request from being made to wait beyond the maximum allowable waiting time by stopping most of the normal system processing modules in a case where a large amount of emergency system processing requests are issued.

A method of determining the upper limit of the number of normal system processing modules NM that can be temporarily stopped is dynamically determined by the calculation resource usage state controller 104 by measuring and statistically acquiring in advance a value indicating that a time until completion of a process for each processing request is a certain number of minutes in a case where a certain number of normal system processing modules NM are operating with respect to the number of received normal system processing requests per unit time, and by providing the maximum allowable waiting time, which is agreed upon in advance with a medical institution, indicating that a certain number of minutes of retention time is allowable to the calculation resource usage state controller 104 as a set value. That is, the calculation resource usage state controller 104 dynamically calculates the upper limit of the number of normal system processing modules NM that can be temporarily stopped within a range in which the waiting time until the completion of the process for the normal system processing request (an example of the "second waiting time") falls within the maximum allowable waiting time.

In a case where it is expected that the waiting time until the completion of the process for an emergency system processing request exceeds the maximum allowable waiting time even though the normal system processing modules NM are temporarily stopped up to the upper limit number that can be temporarily stopped and a plurality of emergency system processing modules EM are activated instead, the calculation resource usage state controller 104 activates an (M+1)th calculation server and activates an emergency system processing module EM in the (M+1)th calculation server as shown in FIG. 4.

Here, it is desirable that the number of emergency system processing modules activated in the (M+1)th server is the maximum number of emergency system processing modules EM which can be activated in the added calculation server M+1. In general, a process for temporarily stopping and activating a processing module is completed in several seconds to several tens of seconds at the longest; however, additional activation of a calculation server also requires activation of an OS or the like, and thus takes several minutes. Therefore, it is desirable that timing for starting an operation of adding a calculation server starts before the number of emergency system processing modules EM in operation becomes insufficient. Therefore, it is desirable that a threshold value for starting the operation of adding a calculation server is set to a threshold value at which a process for adding a calculation server can be performed with spare capacity by using an increase rate of the number of emergency system processing requests or the like as an index. In FIG. 4, as an example, an example in which one (M+1)th calculation server is added has been described, but in a case where addition of only one calculation server is insufficient, the number of calculation servers that are added may be increased to M+2, M+3, . . . and so on.

In addition, in the examples of FIGS. 3 and 4, a reason for attempting to address the emergency system processing request by temporarily stopping the normal system processing module NM instead of adding a calculation server as soon as the emergency system processing request is received is that it is desirable to address an increase in demand for the emergency system processing request without increasing the number of calculation servers as much as possible since adding a calculation server increases the operation cost.

In the description of FIG. 4, it is described that calculation servers are gradually added, but it is desirable to set an upper limit to the number of servers that can be added. In order to determine the upper limit number, a demand peak of the emergency system processing request is calculated in advance from a measured value or the like, and a degree of the maximum waiting time for the emergency system processing request at the peak is calculated and is agreed upon in advance with a medical institution. A medical institution that wishes to further shorten the maximum waiting time can shorten the waiting time by contracting for a high-speed plan that will be described later.

In addition, the temporarily stopped normal system processing module NM, having priority over other processing requests waiting for a process in the normal system processing request queue 106, resumes the process as soon as a process of other normal system processing modules NM in operation is completed. As a method of resuming the process, a method of arranging the process temporarily stopped during the temporary stop at a head of the normal system processing request queue 106 is conceivable.

In procedure [4] shown in FIG. 3 or 4, the processing request distribution controller 102 distributes the received processing request to the normal system processing request queue 106 or the emergency system processing request queue 108 depending on a type of the received processing request.

In procedure [5], each of the normal system processing module NM and the emergency system processing module EM receives the corresponding processing request from the normal system processing request queue 106 or the emergency system processing request queue 108.

The normal system processing module NM that has received the normal system processing request from the normal system processing request queue 106 and the emergency system processing module EM that has received the emergency system processing request from the emergency system processing request queue 108 perform a necessary process corresponding to the respective processing request in procedure [6]. In the example in FIG. 2, the normal system processing module NM in charge of the normal system process acquires the processing request from the normal system processing request queue 106 and performs the process.

In procedure [7], each user terminal 30 acquires a processing result from the medical system processing server cluster. Each user terminal 30 may periodically inquire with the medical system processing server cluster whether or not a processing result can be acquired, and may start acquisition of the result from the medical system processing server cluster in a case where the result can be acquired, or the medical system processing server cluster may notify the user terminal 30 that the result can be acquired, and the user terminal 30 may start the acquisition of the result in response to the notification. The terminal user views the analysis result as soon as the analysis result is acquired by the user terminal 30.

<System Behavior in Case where Demand for Emergency System Processing Request is Reduced>

In FIGS. 3 and 4, how the medical information processing system 10 operates to enhance the processing capability for the emergency system processing request in response to the increase in demand for the emergency system processing request has been described. Hereinafter, operation of the present system for a decrease in demand for the emergency system processing request will be described. Since a system behavior for the decrease in demand for the emergency system processing request overlaps with FIGS. 2 to 4 related to the system behavior for the increase in demand described in FIGS. 2 to 4 in many parts, the illustration thereof is omitted.

The processing request distribution controller 102 that monitors the calculation resource usage state controller 104 detects that there is an emergency system processing module EM waiting for a process in a case where the number of received emergency system processing requests decreases. The calculation resource usage state controller 104 may acquire information indicating an operation state of the emergency system processing module EM in each calculation server.

In a case where the number of emergency system processing modules EM that remain in a processing-waiting state is maintained for a certain period of time, the calculation resource usage state controller 104 starts operation for decreasing a calculation resource allocation for the emergency system processing module EM. System operation in this case will be described hereinafter.

It is preferable that conditions such as defined time of "a certain period of time" that is a start condition of the operation of decreasing the calculation resource allocation for the emergency system processing module EM and a defined number of "the number" of the emergency system processing modules EM waiting for a process can be set from an outside.

In a case where a state in which the number of the emergency system processing modules EM remaining in the processing-waiting state is equal to or greater than the defined number is maintained for the defined time or more, first, the calculation resource usage state controller 104 prioritizes recovering processing capability for the normal system processing request. Explaining this using FIG. 4 as an example, among the emergency system processing modules EM that have been started up in the respective calculation servers of normal plan servers NPS2 to NPSM shown in FIG. 4, the emergency system processing modules EM in the processing-waiting state are sequentially stopped, and the normal system processing modules NM are gradually started up instead of the stopped emergency system processing modules EM to approach the state of FIG. 1.

In a state where all of the emergency system processing modules EM that have been started up on calculation servers NPS2 to NPSM are replaced with the normal system processing modules NM, and further, in a case where the emergency system processing modules EM in the processing-waiting state exist in calculation servers NPSM+1, NPSM+2, . . . and so on, as soon as the number of the emergency system processing modules EM in the processing-waiting state becomes larger than N (the maximum number of the emergency system processing modules started up in each calculation server), the (M+1)th and subsequent calculation servers are stopped one by one in a unit of N.

As described above, in a case where the increase in demand for the emergency system processing request occurs while a calculation server is stopped because of the decrease in demand for the emergency system processing request, the number of emergency system processing modules EM is gradually increased again in accordance with the flow described in procedure [3] of FIGS. 3 and 4.

<Example 3> an Example of System Behavior of a Case where a High-Speed Plan Contractor Uses the Present System FIG. 5 shows an example in which a high-speed plan contractor is added as an element and a high-speed plan server is added to the medical information processing system 10 in addition to the situation shown in FIG. 4. Displays of "high-speed plan server 1", . . . and "high-speed plan server R" shown in FIG. 5 are calculation servers for processing module deployment, and represent servers shared among high-speed plan contractors. Each of the R calculation servers is expressed as a calculation server HPS1, . . . or HPSR. The calculation servers HPS1, . . . and HPSR as the high-speed plan servers are configured using a virtual machine. The number R of the high-speed plan servers is determined so that the maximum allowable waiting time promised in the high-speed plan is implemented, similarly to the number M of the normal plan servers.

With reference to FIG. 5, system operation of a case where a high-speed plan contractor also uses the medical system processing server cluster will be described.

An estimated waiting time until the completion of the process for both a normal system processing request and an emergency system processing request is displayed on the user terminal 30 regardless of a normal plan contractor or a high-speed plan contractor. The estimated waiting time is calculated on the basis of a value obtained by measuring and statistically obtaining in advance a degree of the waiting time of a case where the number of processing requests waiting for a process of each of the normal system processing request queue 106 and the emergency system processing request queue 108 is a certain number and the number of the processing modules in operation is a certain number. Information on the calculated estimated waiting time is made available for acquisition by each user terminal 30 from the medical system processing server cluster.

A user of each medical institution can check the estimated waiting time displayed on the user terminal 30, and can use the estimated waiting time as a reference for determining whether or not the user wishes the process to be made available earlier.

In FIG. 5, it is shown that a medical institution L has contracted for the high-speed plan. The information that the medical institution L has contracted for the high-speed plan is transmitted from the user terminal to the medical system processing server cluster. The calculation resource usage state controller 104 that has received the information activates the high-speed plan server HPS, and causes additional calculation servers (high-speed plan servers HPS1, . . . and HPSR) to be allocated to the medical institution L as a high-speed plan contractor. In FIG. 5, an example in which the medical institution L has contracted for the high-speed plan is shown, but a plurality of medical institutions can be high-speed plan contractors.

The high-speed plan servers HPS1, . . . and HPSR can be shared by a plurality of medical institutions that have contracted for the high-speed plan. Here, an upper limit of the number of medical institutions that can share the high-speed plan server is a number within a range that does not exceed the maximum allowable waiting time agreed upon at the time of the contract for the high-speed plan. In a case where the number of medical institutions that contract for the high-speed plan exceeds the upper limit, the calculation resource usage state controller 104 further activates additional high-speed plan servers HPSR+1, HPSR+2, . . . and so on.

It is desirable that the high-speed plan server is positioned to add processing capability to the processing capability of a case where the normal plan server is used, and a processing module on the normal plan server is also allocated to a high-speed plan contractor. This is because, as the number of medical institutions sharing the calculation server decreases, the server operation cost that one medical institution has to bear increases, and as a result, a service usage fee becomes high.

The number R of the high-speed plan servers that the calculation resource usage state controller 104 always prepares is determined by dynamically obtaining a value indicating how many calculation servers are to be prepared in addition to the normal plan servers with respect to the number of medical institutions which are currently under contract for the high-speed plan in order to achieve the completion of the process within the maximum allowable waiting time of the normal system process promised in the high-speed plan. Therefore, according to an increase or decrease in the number of high-speed plan contractors, the number of the high-speed plan servers HPS that always operate also increases or decreases.

In a case where an emergency system processing request is transmitted together with a normal system processing request from a high-speed plan contractor, the medical information processing system 10 increases or decreases the number of emergency system processing modules EM and increases or decreases the number of calculation servers according to demand for the emergency system processing request in accordance with the flow of the process described with reference to FIGS. 2 to 4.

The medical system processing server cluster configured using the virtual machine VMk is an example of a "server cluster" in the present disclosure. The processing request distribution controller 102 is an example of a "first controller" in the present disclosure. The process performed by the processing request distribution controller 102 is an example of "processing request distribution control" and "first control" in the present disclosure. The function of the processing request distribution controller 102 is an example of a "first control function" in the present disclosure. The calculation resource usage state controller 104 is an example of a "second controller" in the present disclosure, and the process performed by the calculation resource usage state controller 104 is an example of "calculation resource usage state control" and "second control" in the present disclosure. The function of the calculation resource usage state controller 104 is an example of a "second control function" in the present disclosure. The normal system processing request is an example of a "non-emergency system processing request" in the present disclosure, and the normal system processing request queue 106 is an example of a "non-emergency system processing request queue" in the present disclosure. The normal system processing module NM is an example of a "non-emergency system processing module" in the present disclosure.

Example of Intra-Medical-Institution Information System

FIG. 6 is a block diagram showing an example of an intra-medical-institution information system 300 of a plurality of medical institutions using the processing service of the medical information processing system 10. FIG. 6 shows an example in which the intra-medical-institution information system 300 having the same system configuration is constructed in each intra-medical-institution network in a plurality of medical institutions for simplicity of illustration, but each medical institution can adopt a different system configuration.

The intra-medical-institution information system 300 is a computer network including a modality 340, a digital imaging and communications in medicine (DICOM) server 350, an image processing management terminal 320A, a viewer terminal 322, an electronic medical record system 324, and a private communication line 326.

The modality 340 is an apparatus that captures an examination image. The modality 340 includes an apparatus that images a part to be examined of a subject to generate an examination image representing the part, adds accessory information defined by a DICOM standard to the image, and outputs the image. Specific examples of the modality 340 include a computed tomography (CT) apparatus, a magnetic resonance imaging (MRI) apparatus, an angiographic x-ray diagnostic apparatus, a positron emission tomography (PET) apparatus, an ultrasound apparatus, a computed radiography (CR) apparatus using a flat-panel detector (FPD), a mammography apparatus, and an endoscope apparatus.

The intra-medical-institution information system 300 may include a plurality of types of modalities 340. There can be various combinations of the types and the number of modalities 340 existing on the intra-medical-institution network for each medical institution.

The DICOM server 350 is a server that operates according to a specification of DICOM. The DICOM server 350 is a computer that stores and manages various types of data including an image captured using the modality 340, and comprises a large-capacity external storage device and a program for database management. The DICOM server 350 communicates with other devices via the private communication line 326, and transmits and receives the various types of data including image data. The DICOM server 350 receives the various types of data including the image data generated by the modality 340 via the private communication line 326, stores the data in a recording medium such as the large-capacity external storage device, and manages the data.

The image processing management terminal 320A is an information processing apparatus functioning as the user terminal 30. The image processing management terminal 320A has a communication function for communicating with the medical information processing system 10, and is connected to the medical information processing system via the communication line 20. The image processing management terminal 320A can acquire data from the DICOM server 350 or the like via the private communication line 326. In addition, the image processing management terminal 320A can send a processing result acquired from the medical information processing system to the DICOM server 350 and to the viewer terminal 322. The image processing management terminal 320A may also be used as the viewer terminal 322.

Various types of information including the various types of data stored in a database of the DICOM server 350 and the processing result acquired by the image processing management terminal 320A can be displayed on the viewer terminal 322.

The viewer terminal 322 is a terminal for image viewing called a picture archiving and communication system (PACS) viewer or a DICOM viewer. A plurality of viewer terminals 322 can be connected to the intra-medical-institution network. A form of the viewer terminal 322 is not particularly limited, and may be a personal computer, a workstation, a tablet terminal, or the like. The software embedded in the viewer terminal 322 may be dedicated viewing software, a web browser, or the like. The viewer terminal 322 may function as the user terminal 30 for accessing the medical information processing system 10.

The medical information processing system 10 communicates with the image processing management terminal 320A and/or the viewer terminal 322 of each medical institution via the communication line 20. As described with reference to FIGS. 1 to 5, the medical information processing system 10 provides a medical information processing service in response to a processing request from a plurality of medical institutions. A providing method of the medical image processing service implemented using the medical information processing system 10 is an example of a "medical information processing service providing method" in the present disclosure.

Example of Medical Information Processing Method

Figure 7:
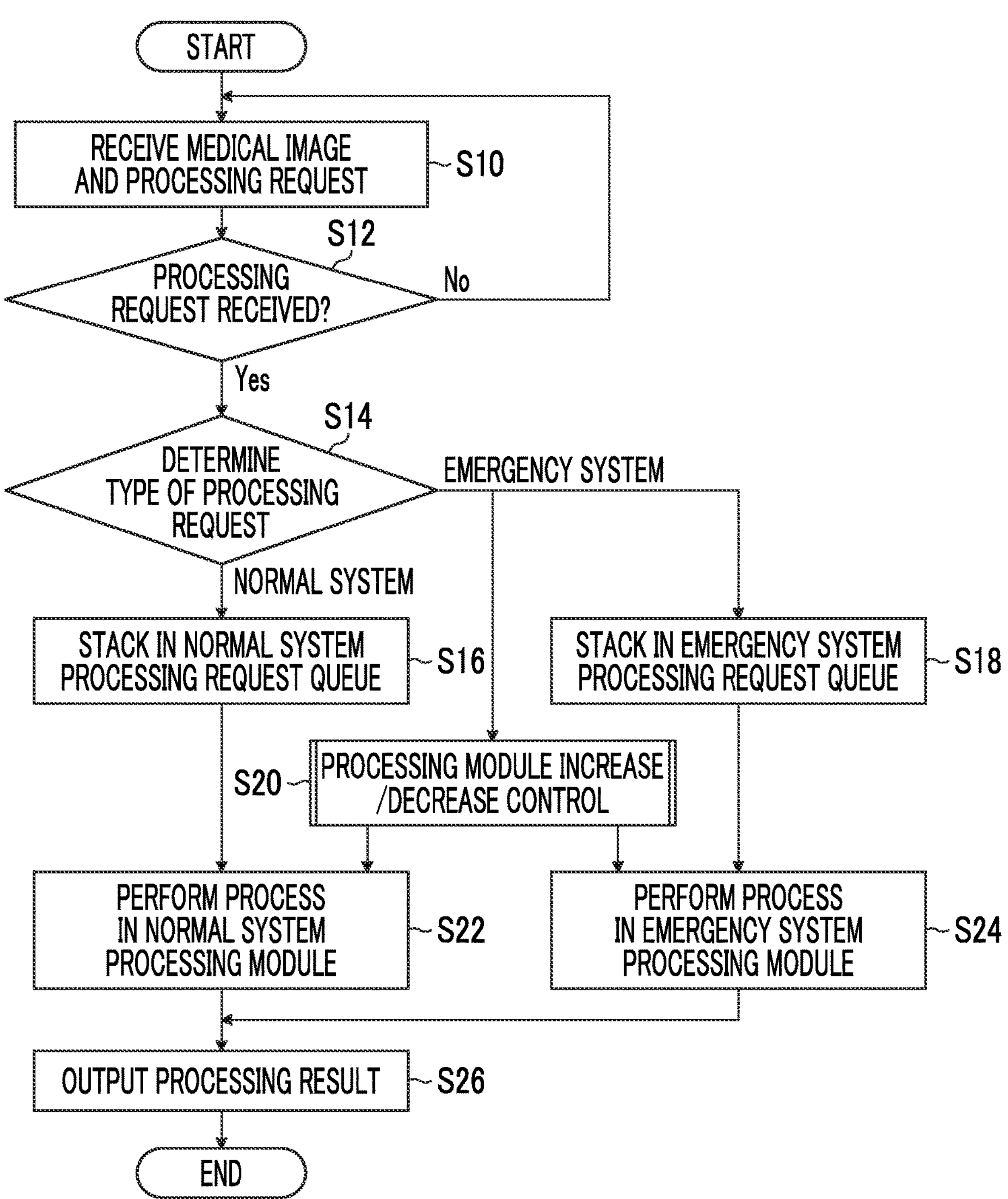
FIG. 7 is a flowchart showing an example of a medical information processing method executed by the medical information processing system according to the embodiment.
Figure 8:
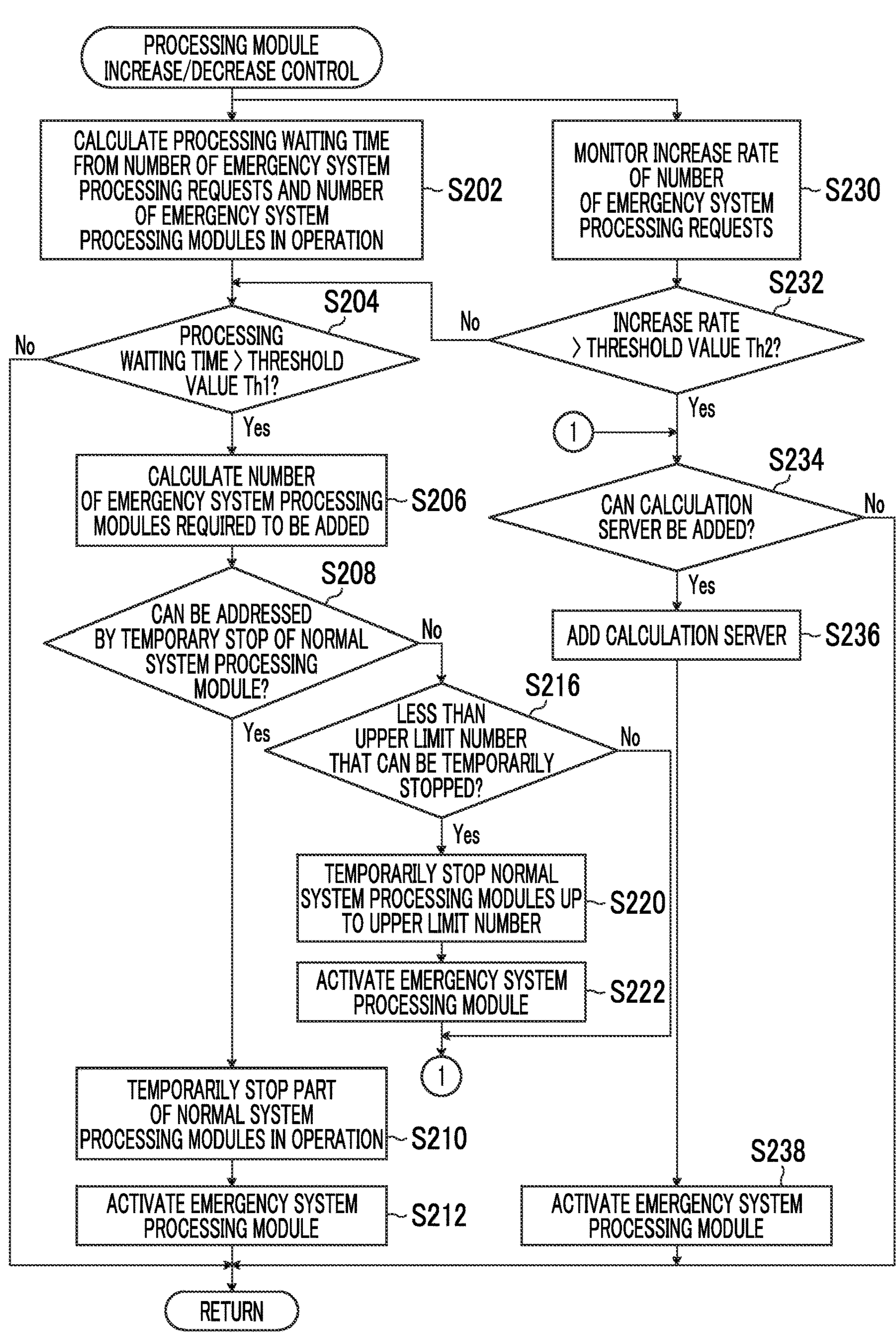
FIG. 8 is a flowchart showing an example of a subroutine applied to step S20 of FIG. 7.
Figure 9:
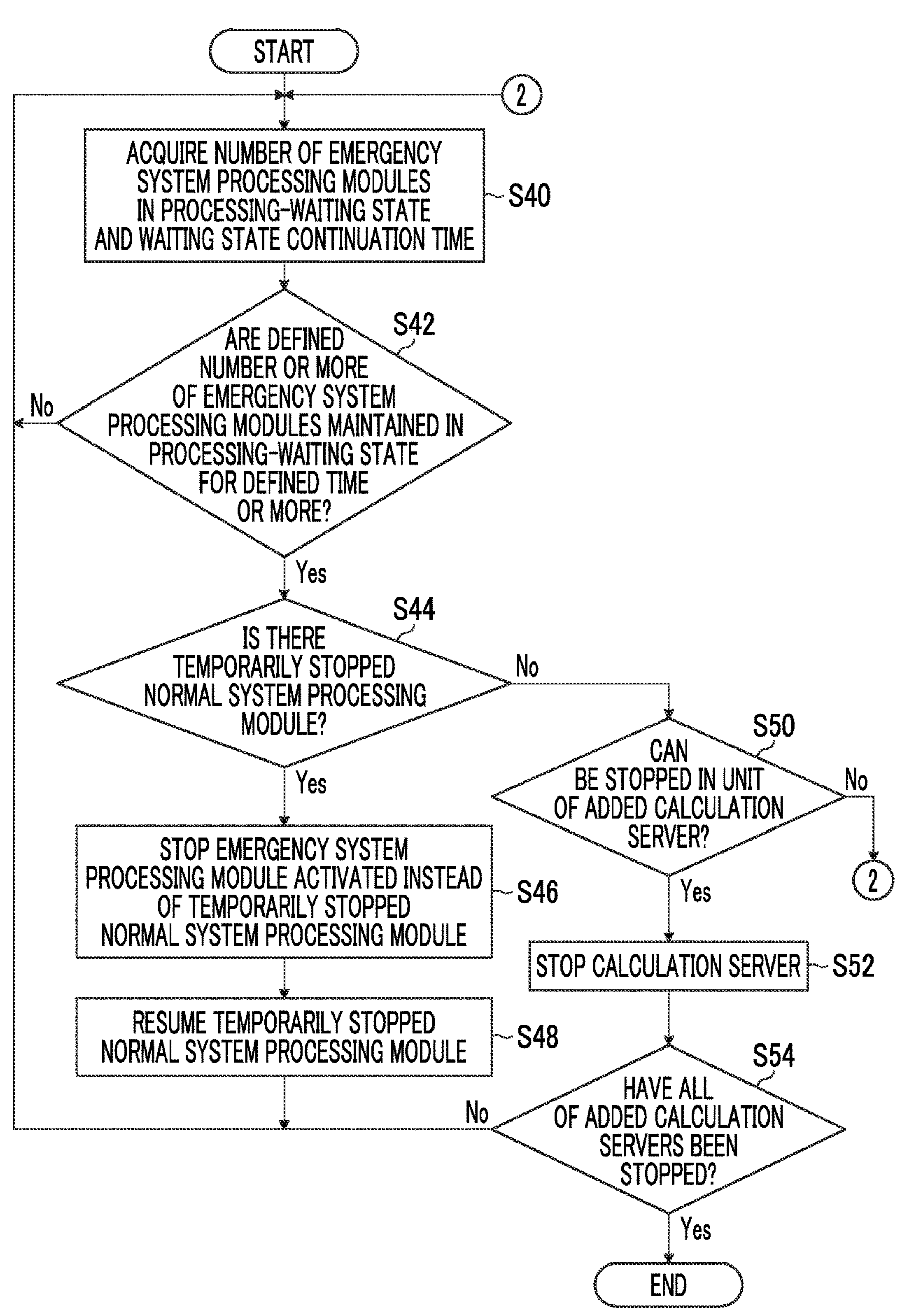
FIG. 9 is a flowchart showing an example of control for decreasing the number of emergency system processing modules corresponding to a decrease in demand for the emergency system processing request.

FIGS. 7 to 9 are flowcharts showing examples of a medical information processing method executed by the medical information processing system 10 according to the embodiment. Each step shown in FIGS. 7 to 9 is executed by a computer functioning as the medical information processing system 10. The medical information processing system 10 can be implemented by a computer system including one or a plurality of physical machines. In addition, the medical information processing system 10 can be implemented by distributed computing. The computer functioning as the medical information processing system 10 is not limited to one computer, and includes a case of being an aggregate of a plurality of computers.

In step S10 of FIG. 7, the medical information processing system 10 receives a medical image as a processing target and a processing request from the user terminals 30 of the plurality of medical institutions.

In step S12, the processing request distribution controller 102 determines whether or not a processing request is received. In a case where a determination result of step S12 is "No", the processing request distribution controller 102 returns to step S10. In a case where the processing request distribution controller 102 receives a processing request and the determination result of step S12 is "Yes", the process proceeds to step S14.

In step S14, the processing request distribution controller 102 determines a type of the received processing request. In a case where the received processing request is a normal system processing request, the processing request distribution controller 102 proceeds to step S16 and sends the normal system processing request to the normal system processing request queue 106.

On the other hand, in a case where a result of the type determination in step S14 is an emergency system processing request, the processing request distribution controller 102 proceeds to step S18 and sends the emergency system processing request to the emergency system processing request queue 108.

In addition, in a case where the result of the type determination in step S14 is an emergency system processing request, the calculation resource usage state controller 104 performs processing module increase/decrease control shown in step S20. A subroutine of step S20 will be described later with reference to FIG. 8.

In a case where normal system processing requests are stacked in the normal system processing request queue 106 in step S16, the normal system processing requests are sequentially transmitted to the normal system processing module NM, and the normal system process is performed in the normal system processing module NM in step S22.

On the other hand, in a case where emergency system processing requests are stacked in the emergency system processing request queue 108 in step S18, the emergency system processing requests are sequentially transmitted to the emergency system processing module EM, and the emergency system process is performed in the emergency system processing module EM in step S24.

The number of processing modules of each of the normal system processing module NM and the emergency system processing module EM operating in step S22 and step S24 is adjusted by the processing module increase/decrease control in step S20.

After step S22 or step S24, in step S26, the medical information processing system 10 outputs a processing result to provide the processing result to the user terminal 30 of a medical institution that is a request source.

FIG. 7 shows a flowchart of one cycle from the reception of the processing request to the transmission of the processing result, but after step S26 of FIG. 7, the medical information processing system 10 may return to step S10 to repeat the flowchart of FIG. 7.

FIG. 8 is a flowchart showing an example of the subroutine applied to step S20 of FIG. 7.

In step S202, the calculation resource usage state controller 104 calculates the processing waiting time until the completion of the process for the emergency system processing request from the number of emergency system processing requests received by the processing request distribution controller 102 and the number of emergency system processing modules EM in operation. The processing waiting time calculated in step S202 is an example of the "first processing waiting time" in the present disclosure.

In step S204, the calculation resource usage state controller 104 determines whether or not the calculated processing waiting time exceeds a threshold value Th1. The threshold value Th1 is the maximum waiting time that is allowable (the maximum allowable waiting time), and more particularly, the maximum allowable waiting time promised in a contract plan. In a case where a threshold value Th1 for a processing request from a medical institution that has contracted for the normal plan is Th1_NP and a threshold value Th1 for a processing request from a medical institution that has contracted for the high-speed plan is Th1_HP, Th1_HP<Th1_NP is satisfied. The threshold value Th1 is an example of the "first allowable waiting time" in the present disclosure.

In a case where a determination result of step S204 is "Yes", the calculation resource usage state controller 104 proceeds to step S206. In step S206, the calculation resource usage state controller 104 calculates the number of emergency system processing modules EM required to be added in order to complete the process within the maximum allowable waiting time promised in the contract plan.

Thereafter, in step S208, the calculation resource usage state controller 104 determines whether or not the request can be addressed by temporarily stopping the normal system processing module NM with the current number of calculation servers unchanged.

In a case where a determination result of step S208 is "Yes", the calculation resource usage state controller 104 proceeds to step S210. In step S210, the calculation resource usage state controller 104 temporarily stops a part of the normal system processing modules in operation, and instead, in step S212, newly activates the required number of emergency system processing modules EM.

On the other hand, in a case where the determination result of step S208 is "No", the calculation resource usage state controller 104 proceeds to step S216. In step S216, the calculation resource usage state controller 104 determines whether or not the number of the normal system processing modules NM which are temporarily stopped is less than the upper limit number that can be temporarily stopped.

In a case where a determination result of step S216 is "Yes", the calculation resource usage state controller 104 proceeds to step S220. In step S220, the calculation resource usage state controller 104 temporarily stops the normal system processing modules NM in operation up to the upper limit number, and instead, newly activates the emergency system processing module EM in step S222.

After step S222, the calculation resource usage state controller 104 proceeds to step S234. In addition, also in a case where the determination result of step S216 is "No", the process proceeds to step S234.

The calculation resource usage state controller 104 monitors the increase rate of the number of emergency system processing requests in step S230 in parallel with the process of step S202 in order to advance the timing of the adding operation in a case where adding the calculation server is required. The increase rate of the number of processing requests can be obtained from the number of received processing requests per unit time.

In step S232, the calculation resource usage state controller 104 determines whether or not the increase rate of the number of emergency system processing requests exceeds a threshold value Th2. As the threshold value Th2, different threshold values may be set for the normal plan and the high-speed plan. In a case where a threshold value Th2 for an increase rate of the number of emergency system processing requests from a medical institution that has contracted for the normal plan is Th2_NP and a threshold value Th2 for an increase rate of the number of emergency system processing requests from a medical institution that has contracted for the high-speed plan is Th2_HP, Th2_HP<Th2_NP may be satisfied.

In a case where a determination result of step S232 is "No", the calculation resource usage state controller 104 proceeds to step S204. In a case where the determination result of step S232 is "No", the calculation resource usage state controller 104 may return to step S230 instead of proceeding to step S204.

On the other hand, in a case where the determination result of step S232 is "Yes", the calculation resource usage state controller 104 proceeds to step S234.

In step S234, the calculation resource usage state controller 104 determines whether or not a calculation server can be added. An upper limit is determined for the number of calculation servers that can be added, and the calculation resource usage state controller 104 determines whether or not a calculation server can further be added within a range of the upper limit.

In a case where a determination result of step S234 is "Yes", the calculation resource usage state controller 104 proceeds to step S236 and adds a calculation server. Then, in step S238, the calculation resource usage state controller 104 newly activates an emergency system processing module on the added calculation server.

After step S212 or step S238, the flowchart of FIG. 8 is ended, and the process returns to the flowchart of FIG. 7.

In addition, in a case where the determination result of step S234 is "No", since a calculation server cannot be added, the flowchart of FIG. 8 is ended, and the process returns to the flowchart of FIG. 7.

FIG. 9 is a flowchart showing an example of control for decreasing the number of the emergency system processing modules EM corresponding to the decrease in demand for the emergency system processing request. The flowchart of FIG. 9 is executed in a case where the process for adding the emergency system processing module EM is performed.

In step S40, the calculation resource usage state controller 104 acquires the number of emergency system processing modules EM in the processing-waiting state and the waiting state continuation time thereof.

In step S42, the calculation resource usage state controller 104 determines whether or not the defined number or more of emergency system processing modules EM are maintained in the processing-waiting state for the defined time or more.

In a case where a determination result of step S42 is "No", the calculation resource usage state controller 104 maintains the current number of emergency system processing modules EM, and returns to step S40.

In a case where the determination result of step S42 is "Yes", the calculation resource usage state controller 104 proceeds to step S44 in order to stop a surplus emergency system processing module EM.

In step S44, the calculation resource usage state controller 104 determines whether or not there is the normal system processing module NM that is temporarily stopped in order to address the increase in demand for the emergency system processing request.

In a case where a determination result of step S44 is "Yes", the calculation resource usage state controller 104 proceeds to step S46 and stops the emergency system processing module activated instead of the temporarily stopped normal system processing module NM. Then, in step S48, the calculation resource usage state controller 104 resumes the temporarily stopped normal system processing module NM. After step S48, the calculation resource usage state controller 104 returns to step S40.

On the other hand, in a case where the determination result of step S44 is "No", the calculation resource usage state controller 104 proceeds to step S50 and determines whether or not the emergency system processing module EM can be stopped in a unit of the added calculation server.

In a case where a determination result of step S50 is "No", the calculation resource usage state controller 104 returns to step S40. In a case where the determination result of step S50 is "Yes", the calculation resource usage state controller 104 proceeds to step S52, stops the emergency system processing module EM in the unit of the calculation server (in the unit of N) for the calculation server in which the surplus emergency system processing module EM is deployed, and stops the calculation server.

Thereafter, in step S54, the calculation resource usage state controller 104 determines whether or not all of the added calculation servers have been stopped. In a case where a determination result of step S54 is "No", the calculation resource usage state controller 104 returns to step S40. On the other hand, in a case where the determination result of step S54 is "Yes", the flowchart of FIG. 9 is ended.

The defined number and the defined time (first defined number and first defined time) of the emergency system processing modules EM in the processing-waiting state that are determination criteria applied in a case of determining whether or not to resume the temporarily stopped normal system processing module NM may be the same as or different from the defined number and the defined time (second defined number and second defined time) of the emergency system processing modules EM in the processing-waiting state that are determination criteria applied in a case of determining whether or not to stop the added calculation server.

Example of Hardware Configuration of Computer

Figure 10:
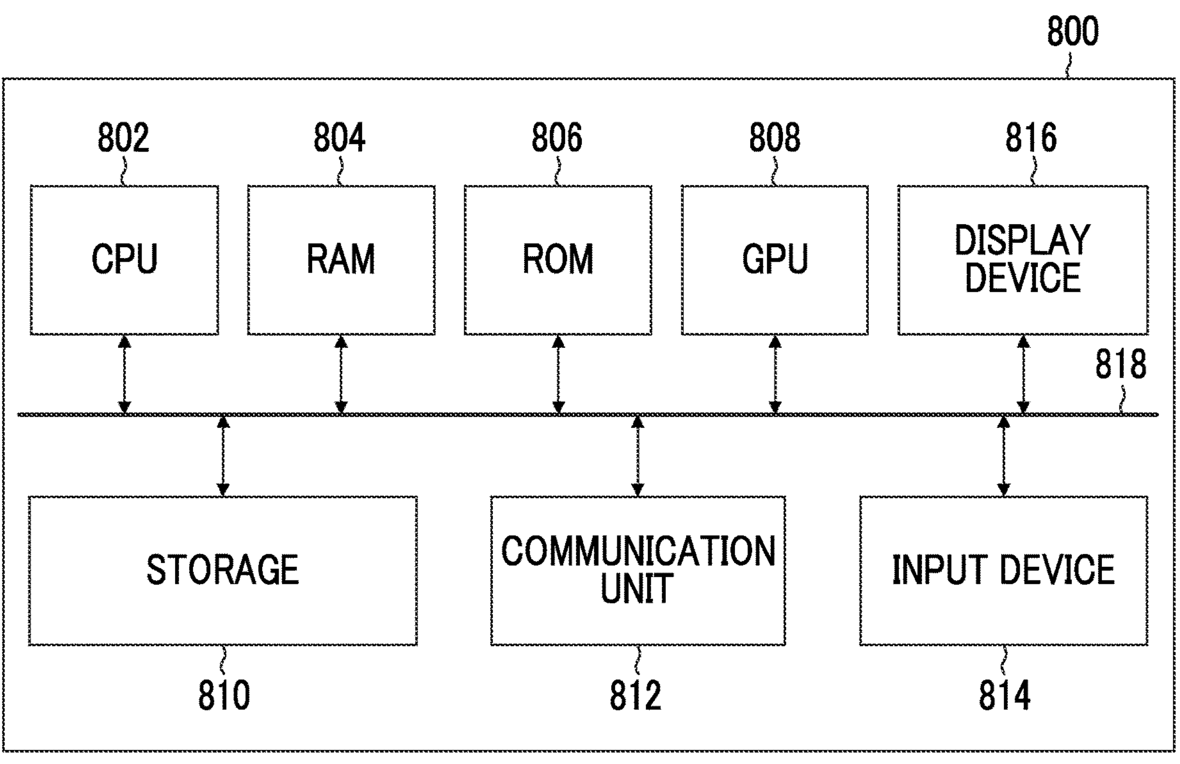
FIG. 10 is a block diagram showing an example of a hardware configuration of a computer.

FIG. 10 is a block diagram showing an example of a hardware configuration of a computer. A computer 800 may be a server computer, a personal computer, or a workstation. The computer 800 can be used as an apparatus that comprises a part or all of any of the medical information processing system 10, the user terminal 30, the DICOM server 350, the electronic medical record system 324, the image processing management terminal 320A, and the viewer terminal 322 described above, or that has a plurality of functions thereof.

The computer 800 comprises a central processing unit (CPU) 802, a random-access memory (RAM) 804, a read-only memory (ROM) 806, a graphics processing unit (GPU) 808, a storage 810, a communication unit 812, an input device 814, a display device 816, and a bus 818. The GPU 808 may be provided as needed.

The CPU 802 reads out various programs stored in the ROM 806, the storage 810, or the like and executes various processes in accordance with instructions of the programs. The RAM 804 is used as a work region of the CPU 802. In addition, the RAM 804 is used as a storage unit that transitorily stores the read-out programs and various types of data.

For example, the storage 810 is configured to include a hard disk apparatus, an optical disc, a magneto-optical disk, a semiconductor memory, or a storage device configured using an appropriate combination thereof. The storage 810 stores various programs, data, and the like. By loading the programs stored in the storage 810 into the RAM 804 and executing the programs via the CPU 802, the computer 800 functions as a unit that performs various processes defined by the programs.

The communication unit 812 is an interface for performing a communication process with an external apparatus in a wired or wireless manner and exchanging information with the external apparatus. The communication unit 812 can have a role as an information acquisition unit that receives an input of data of a processing target, a processing request, and the like. In addition, the communication unit 812 can have a role as an information output unit that outputs a processing result and the like.

The input device 814 is an input interface for receiving various types of operation input for the computer 800. For example, the input device 814 may be a keyboard, a mouse, a multi-touch panel, other pointing devices, a voice input device, or an appropriate combination thereof.

The display device 816 is an output interface on which various types of information are displayed. For example, the display device 816 may be a liquid-crystal display, an organic electro-luminescence (OEL) display, a projector, or an appropriate combination thereof.

<<About Program for Operating Computer>>

A program that causes the computer to implement a part or all of at least one processing function of various processing functions in the medical information processing system 10 described in the embodiment described above can be recorded on a computer-readable medium that is an optical disc, a magnetic disk, a semiconductor memory, or another non-transitory tangible information storage medium, and the program can be provided via the information storage medium.

In addition, instead of an aspect of providing the program by storing the program in the non-transitory tangible computer-readable medium, a program signal can be provided as a download service by using an electric communication line such as the Internet.

<<About Hardware Configuration of Each Processing Unit>>

A hardware structure of a processing unit that executes various processes of the processing request distribution controller 102, the calculation resource usage state controller 104, the normal system processing request queue 106, the emergency system processing request queue 108, the normal system processing module NM, the emergency system processing module EM, and the like in the medical information processing system 10 is, for example, various processors shown below.

The various processors include a CPU that is a general-purpose processor functioning as various processing units by executing a program, a GPU that is a processor specialized in an image process, a programmable logic device (PLD) such as a field-programmable gate array (FPGA) that is a processor of which a circuit configuration can be changed after manufacture, a dedicated electric circuit such as an application-specific integrated circuit (ASIC) that is a processor having a circuit configuration dedicatedly designed to execute a specific process, and the like.

One processing unit may be configured of one of the various processors or may be configured of two or more processors of the same type or different types. For example, one processing unit may be configured of a plurality of FPGAs, a combination of a CPU and an FPGA, or a combination of a CPU and a GPU. In addition, a plurality of processing units may be configured by one processor. Examples of the plurality of processing units configured of one processor include, first, as represented by a computer such as a client or a server, a form in which one processor is configured of a combination of one or more CPUs and software, and the processor functions as the plurality of processing units. Second, as represented by a system-on-chip (SoC) or the like, a form of using a processor that implements functions of a whole system including the plurality of processing units via one integrated circuit (IC) chip is included. As described above, the various processing units are configured using one or more of the various processors as the hardware structure.

Further, the hardware structure of the various processors is more specifically an electric circuit (circuitry) in which circuit elements such as semiconductor elements are combined.

Advantages of Present Embodiment

According to the medical information processing system 10 according to the embodiment, there are the following advantages.

[1] It is possible to dynamically adjust the number of operating normal system processing modules NM and the number of operating emergency system processing modules EM according to an increase or decrease in demand for the emergency system processing request. Accordingly, it is possible to aim to optimize calculation resources that are used, and to return a processing result within the maximum allowable waiting time for each of the emergency system process and the normal system process while reducing the server operation cost as much as possible.

[2] It is possible to meet needs of a medical institution that wishes to further shorten the processing waiting time by preparing two types of plans, that is, the normal plan and the high-speed plan.

Other

Configurations of the embodiment of the present invention described above can be appropriately changed, added, or removed without departing from the gist of the present invention. The present invention is not limited to the embodiment described above and can be subjected to many modifications by those skilled in the art within the technical idea of the present invention.

EXPLANATION OF REFERENCES

10: medical information processing system
20: communication line
26: private communication line
30: user terminal
40: modality
50: DICOM server
102: processing request distribution controller
104: calculation resource usage state controller
106: normal system processing request queue
108: emergency system processing request queue
300: intra-medical-institution information system
320A: image processing management terminal
322: viewer terminal
324: electronic medical record system
326: private communication line
340: modality
350: DICOM server
800: computer
802: CPU
804: RAM
806: ROM
808: GPU
810: storage
812: communication unit
814: input device
816: display device
818: bus
VM0, VM1, VMk: virtual machine
NM: normal system processing module
NM1, NM2, NMN: normal system processing module
EM: emergency system processing module
EM1, EM2, EMN: emergency system processing module
NPS1, NPS2, NPSM, NPSM+1: normal plan server (calculation server)
HPS1, HPSM: high-speed plan server (calculation server)
MI1, MI2, MIL: medical institution
S10 to S26: step of medical information processing method according to embodiment
S202 to S238: step of processing module increase/decrease control
S40 to S54: step of control for decreasing number of emergency system processing modules corresponding to decrease in demand for emergency system processing request

What is claimed is:

1. A medical information processing system comprising one or more processors configured to implement a plurality of virtual machines, a processor of the one or more processors is configured to:

perform processing request distribution of receiving a non-emergency system processing request and an emergency system processing request and distribute the non-emergency system processing request to a non-emergency system processing request queue and the emergency system processing request to an emergency system processing request queue depending on whether each of the non-emergency system processing request and the emergency system processing request is a process classified into non-emergency or a process classified into emergency, wherein the emergency system processing request is associated with a first allowable waiting time for the emergency processing request to complete and the non-emergency system processing request is associated with a second allowable waiting time for the non-emergency processing request to complete;

monitor the non-emergency system processing request queue and perform a process of a non-emergency system corresponding to instruction content of the non-emergency system processing request stacked in the non-emergency system processing request queue;

monitor the emergency system processing request queue and perform a process of an emergency system corresponding to instruction content of the emergency system processing request stacked in the emergency system processing request queue; and perform calculation resource usage state control for controlling the number of the non-emergency system processes to be operated and the number of the emergency system processes to be operated based on the number of the emergency system processing requests that have been received and the number of the emergency system processes in operation and the second allowable waiting time, wherein the calculation resource usage state control includes a process for temporarily stopping a part of a plurality of the non-emergency system processes in operation and newly activating the emergency system process to increase the number of the emergency system processes in response to a first processing waiting time from receiving the emergency system processing request until completion being longer than a first allowable waiting time determined based on a number of the non-emergency system processes that can be temporarily stopped.

2. The medical information processing system according to claim 1, wherein the first allowable waiting time is dynamically calculated based on an upper limit of the number of the non-emergency system processes that can be temporarily stopped to accommodate the emergency system processing request in a manner that the none-emergency system processes can still finish within the second processing waiting time.

3. The medical information processing system according to claim 1, wherein the processor is configured to:

dynamically calculate an upper limit of the number of the non-emergency system processes that are temporarily stoppable within a range in which the second processing waiting time until completion of a process for the non-emergency system processing request falls within the second allowable waiting time, temporarily stop the non-emergency system processes of which the number does not exceed the upper limit, and newly activate the emergency system process instead.

4. The medical information processing system according to claim 1, wherein the processor is configured to:

increase the number of the plurality of virtual machines and newly activate the plurality of emergency system processes on a virtual machine that has been added to increase the number of the emergency system processes.

5. The medical information processing system according to claim 1, wherein the processor is configured to:

decrease the number of the emergency system processes in a case where a state in which the number of the emergency system processes waiting for a process is equal to or greater than a defined number is maintained for defined time or more.

6. The medical information processing system according to claim 1, wherein the processor is configured to:

decrease the number of the emergency system processes added with temporary stop of the non-emergency system process and resume the non-emergency system process that has been temporarily stopped in a case where a state in which the number of the emergency system processes waiting for a process is equal to or greater than a first defined number is maintained for first defined time or more.

7. The medical information processing system according to claim 4, wherein the processor is configured to:

decrease the number of the emergency system processes on the virtual machine that has been added and decrease the number of the virtual machines that has been added in a case where a state in which the number of the emergency system processes waiting for a process is equal to or greater than a second defined number is maintained for second defined time or more.

8. The medical information processing system according to claim 4, wherein the processor is configured to:

decrease the number of the emergency system processes added with temporary stop of the non-emergency system process and resume the non-emergency system process that has been temporarily stopped in a case where a state in which the number of the emergency system processes waiting for a process is equal to or greater than a first defined number is maintained for first defined time or more; and after resuming all of the non-emergency system processes that have been temporarily stopped, decrease the number of the emergency system processes on the virtual machine that has been added and decrease the number of the virtual machines that have been added.

9. The medical information processing system according to claim 1, wherein the processor is configured to:

calculate a current processing waiting time of a case of receiving a processing request for each of the non-emergency system processing request and the emergency system processing request and provide a user terminal of a medical institution with information on the current processing waiting time.

10. The medical information processing system according to claim 1, wherein the processor is configured to:

prepare a first plan promising that a maximum waiting time until completion of a process for the non-emergency system processing request is a third waiting time, and a maximum waiting time until completion of a process for the emergency system processing request is a fourth waiting time shorter than the third waiting time, and a second plan promising that at least one of the maximum waiting time until the completion of the process for the non-emergency system processing request or the maximum waiting time until the completion of the process for the emergency system processing request is a waiting time shorter than the maximum waiting time of the first plan; and include the non-emergency system process, the emergency system process, and the virtual machine for the first plan that are allocated to a process of a processing request from a medical institution that has selected the first plan, and the non-emergency system process, the emergency system process, and the virtual machine for the second plan that are allocated to a process of a processing request from a medical institution that has selected the second plan.

11. The medical information processing system according to claim 10, wherein the processor is configured to:

increase or decrease the number of the non-emergency system processes for the second plan, the number of the emergency system processes for the second plan, and the number of the virtual machines for the second plan according to an increase or decrease in the number of the medical institutions selecting the second plan.

12. A medical information processing service providing method implemented by using the medical information processing system according to claim 1, comprising:

receiving, by the medical information processing system, the processing request from a plurality of medical institutions via a communication line; and executing, by the medical information processing system, a process corresponding to the processing request and returning the processing result to a medical institution that is a request source of the processing request.

13. A medical information processing method that is executed by a computer comprising one or more processors configured to implement a plurality of virtual machines, the method comprising:

performing processing request distribution of receiving a non-emergency system processing request and an emergency system processing request and distribute the non-emergency system processing request to a non-emergency system processing request queue and the emergency system processing request to an emergency system processing request queue depending on whether each of the non-emergency system processing request and the emergency system processing request is a process classified into non-emergency or a process classified into emergency, wherein the emergency system processing request is associated with a first allowable waiting time for the emergency processing request to complete and the non-emergency system processing request is associated with a second allowable waiting time for the non-emergency processing request to complete;

monitoring the non-emergency system processing request queue and perform a process of a non-emergency system corresponding to instruction content of the non-emergency system processing request stacked in the non-emergency system processing request queue;

monitoring the emergency system processing request queue and perform a process of an emergency system corresponding to instruction content of the emergency system processing request stacked in the emergency system processing request queue; and performing calculation resource usage state control for controlling the number of the non-emergency system processes to be operated and the number of the emergency system processes to be operated based on the number of the emergency system processing requests that have been received and the number of the emergency system processes in operation and the second allowable waiting time, wherein the calculation resource usage state control includes a process for temporarily stopping a part of a plurality of the non-emergency system processes in operation and newly activating the emergency system process to increase the number of the emergency system processes in response to the first processing waiting time from receiving the emergency system processing request until completion being longer than a first allowable waiting time determined based on a number of the non-emergency system processes that can be temporarily stopped.

14. A non-transitory, computer-readable tangible recording medium which records thereon a program for causing a computer comprising one or more processors configured to implement a plurality of virtual machines collectively implement a process comprising:

performing processing request distribution of receiving a non-emergency system processing request and an emergency system processing request and distribute the non-emergency system processing request to a non-emergency system processing request queue and the emergency system processing request to an emergency system processing request queue depending on whether each of the non-emergency system processing request and the emergency system processing request is a process classified into non-emergency or a process classified into emergency, wherein the emergency system processing request is associated with a first allowable waiting time for the emergency processing request to complete and the non-emergency system processing request is associated with a second allowable waiting time for the non-emergency processing request to complete;

monitoring the non-emergency system processing request queue and perform a process of a non-emergency system corresponding to instruction content of the non-emergency system processing request stacked in the non-emergency system processing request queue;

monitoring the emergency system processing request queue and perform a process of an emergency system corresponding to instruction content of the emergency system processing request stacked in the emergency system processing request queue; and performing calculation resource usage state control for controlling the number of the non-emergency system processes to be operated and the number of the emergency system processes to be operated based on the number of the emergency system processing requests that have been received and the number of the emergency system processes in operation and the second allowable waiting time, wherein the calculation resource usage state control includes a process for temporarily stopping a part of a plurality of the non-emergency system processes in operation and newly activating the emergency system process to increase the number of the emergency system processes in response to the first processing waiting time from receiving the emergency system processing request until completion being longer than a first allowable waiting time determined based on a number of the non-emergency system processes that can be temporarily stopped.

* * * * *